US012368292B2

(12) United States Patent
Parke et al.

(10) Patent No.: US 12,368,292 B2
(45) Date of Patent: Jul. 22, 2025

(54) DROP CABLE CLAMP WITH CONTROLLED CABLE CUTTING FEATURE

(71) Applicant: CommScope Technologies LLC, Hickory, NC (US)

(72) Inventors: Daniel J. Parke, Hickory, NC (US); Norin P. Pausan, St Asaph (GB); John D. Farmer, Sherrills Ford, NC (US)

(73) Assignee: CommScope Technologies LLC, Hickory, NC (US)

( * ) Notice: Subject to any disclaimer, the term of this patent is extended or adjusted under 35 U.S.C. 154(b) by 226 days.

(21) Appl. No.: 17/853,919

(22) Filed: Jun. 30, 2022

(65) Prior Publication Data
US 2022/0352702 A1    Nov. 3, 2022

Related U.S. Application Data

(63) Continuation of application No. PCT/US2021/012382, filed on Jan. 6, 2021.
(Continued)

(51) Int. Cl.
*H02G 7/05*    (2006.01)
*H02G 1/00*    (2006.01)

(52) U.S. Cl.
CPC ............. *H02G 7/056* (2013.01); *H02G 1/005* (2013.01)

(58) Field of Classification Search
CPC .............................. H02G 7/056; H02G 1/005
See application file for complete search history.

(56) References Cited

U.S. PATENT DOCUMENTS 3,624,720 A * 11/1971 Laky .................... B23D 29/002
                                                                    83/639.1
4,637,098 A *  1/1987 Okura .................... F16G 11/02
                                                                    D8/394
(Continued)

FOREIGN PATENT DOCUMENTS

AU      2013100238 A4 *  3/2013  ........... G02B 6/4471
CA         2018850 C  *  2/2000
(Continued)

OTHER PUBLICATIONS

Youtube video of wire strike protection system (WSPS) of Magellan from bristolmarketing2011 dated Dec. 21, 2011, https://www.youtube.com/watch?v=rm6MwldY4TA (Year: 2011).*
(Continued)

*Primary Examiner* — Eret C McNichols
*Assistant Examiner* — Ding Y Tan
(74) *Attorney, Agent, or Firm* — Muncy, Geissler, Olds & Lowe, P.C.

(57) ABSTRACT

A cable clamp includes a shell having a shell base, a first sidewall and a second sidewall forming a channel extending in a first direction to receive a cable therein. A wedge resides between the first and second sidewalls and includes a wedge base facing the shell base. A shim resides between the wedge base and the shell base, and the cable fits between the shim and the shell base. Movement of the shell relative to the wedge causes the cable to engage more tightly between the shim and the shell base. In one embodiment, a blade element resides between the shim and the shell base. The blade may be a separate element from the shim or attached to or integrally formed with the shim. The wedge may include a recessed area or a cutout portion to accommodate the blade. A cutting edge of the blade element faces toward the cable and will cut the cable in response to an excessive force along (Continued)

the first direction being applied to the cable within the channel.

15 Claims, 24 Drawing Sheets

Related U.S. Application Data

(60) Provisional application No. 62/983,492, filed on Feb. 28, 2020, provisional application No. 62/958,274, filed on Jan. 7, 2020.

(56) References Cited

U.S. PATENT DOCUMENTS

| | | | |
|---|---|---|---|
| 4,662,710 A | 5/1987 | ten Berge | |
| 4,687,365 A | 8/1987 | Promersberger | |
| 4,939,821 A * | 7/1990 | Frank, Jr. | H02G 7/056 24/115 M |
| 5,050,273 A * | 9/1991 | Okura | F16L 3/133 248/58 |
| 5,121,525 A * | 6/1992 | Okura | F16G 11/02 24/115 M |
| 5,142,745 A * | 9/1992 | Setty | F16G 11/02 24/115 M |
| 5,226,216 A | 7/1993 | Pizzi | |
| 5,226,620 A | 7/1993 | Libert | |
| 5,322,132 A * | 6/1994 | Franks, Jr. | H02G 7/056 174/41 |
| 5,599,129 A | 2/1997 | Clifton et al. | |
| 5,869,785 A * | 2/1999 | Bechamps | H02G 3/26 403/374.1 |
| 6,397,948 B1 * | 6/2002 | Williams | E21B 43/017 114/221 A |
| 6,526,858 B1 * | 3/2003 | Smith | B26D 1/02 166/54.5 |
| 6,581,251 B2 * | 6/2003 | Malin | F16G 11/02 174/79 |
| 7,097,153 B2 * | 8/2006 | Rivers | H02G 1/081 254/134.3 FT |
| 7,234,669 B2 * | 6/2007 | Franks, Jr. | F16L 3/1226 24/115 M |
| 7,290,748 B2 | 11/2007 | McDonald | |
| 8,517,317 B2 * | 8/2013 | Malin | H02G 7/056 248/74.1 |
| 9,938,780 B2 * | 4/2018 | Begnaud | E21B 19/084 |
| 10,612,337 B2 * | 4/2020 | Dursley | E21B 33/0385 |
| 2003/0079315 A1 * | 5/2003 | Malin | H02G 7/056 24/136 R |
| 2003/0188432 A1 | 10/2003 | Temple | |
| 2004/0035984 A1 | 2/2004 | Franks et al. | |
| 2004/0161218 A1 | 8/2004 | Sloan et al. | |
| 2005/0098335 A1 * | 5/2005 | LoGuidice | H02G 1/04 174/1 |
| 2005/0218269 A1 * | 10/2005 | Franks, Jr. | F16L 3/1226 248/63 |
| 2005/0254768 A1 * | 11/2005 | Franks | F16L 3/10 385/136 |
| 2012/0273628 A1 * | 11/2012 | Malin | H02G 7/056 248/74.1 |
| 2013/0223808 A1 * | 8/2013 | Harvey | G02B 6/4471 385/136 |
| 2015/0183623 A1 | 7/2015 | Wacinski et al. | |
| 2020/0355241 A1 * | 11/2020 | Malin | F16G 11/048 |
| 2021/0199908 A1 * | 7/2021 | Sachs | G02B 6/4471 |
| 2022/0329057 A1 * | 10/2022 | Lowe | F16G 11/04 |
| 2024/0053568 A1 * | 2/2024 | Malin | G02B 6/4471 |

FOREIGN PATENT DOCUMENTS

| | | | |
|---|---|---|---|
| CN | 205811489 U * | 12/2016 | |
| CN | 108574248 A * | 9/2018 | H02G 7/18 |
| DE | 1175308 B | 8/1964 | |
| FR | 590310 A | 6/1925 | |
| WO | WO 2006/113088 | 10/2006 | |
| WO | WO 2017/075218 A1 | 5/2017 | |

OTHER PUBLICATIONS

CommScope, "Over Head Communications Lines Mechanical Breakaway System," prior to Dec. 23, 2019, pp. 1-2, CommScope, 1100 CommScope Place, SE, Hickory, NC 28602, USA.
EPO Office Action for EP Application No. 21 702 148.4 - 1201 mailed Jun. 3, 2025 (9 Pages).

* cited by examiner

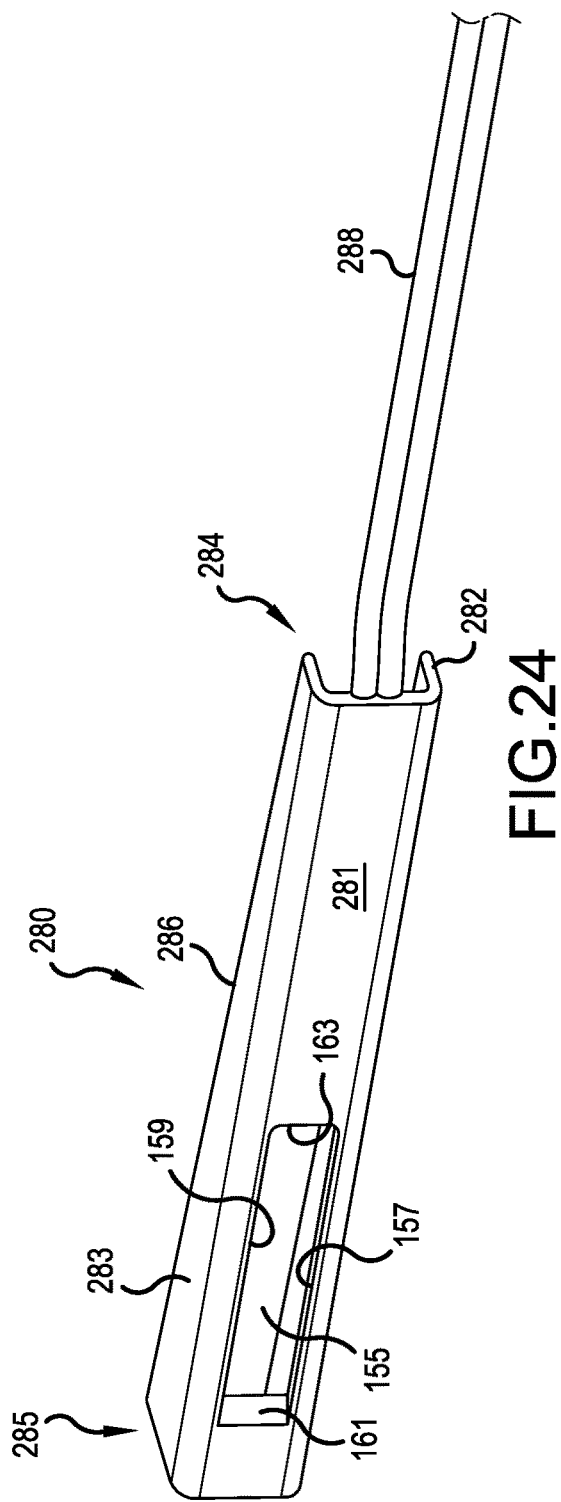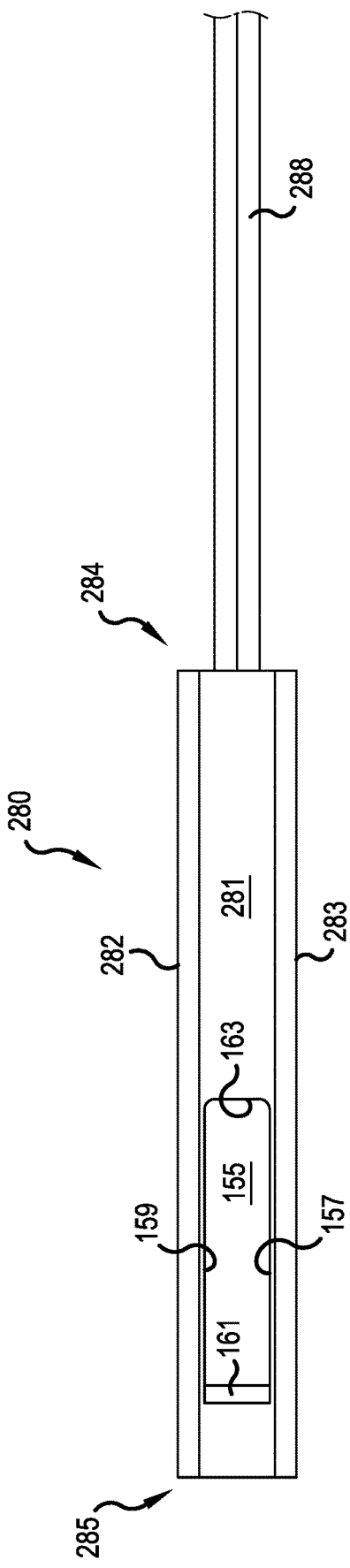

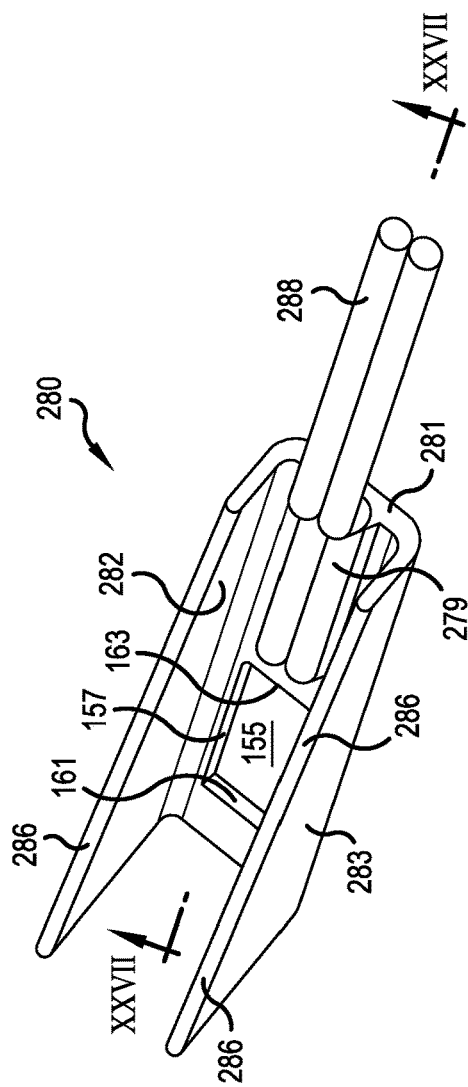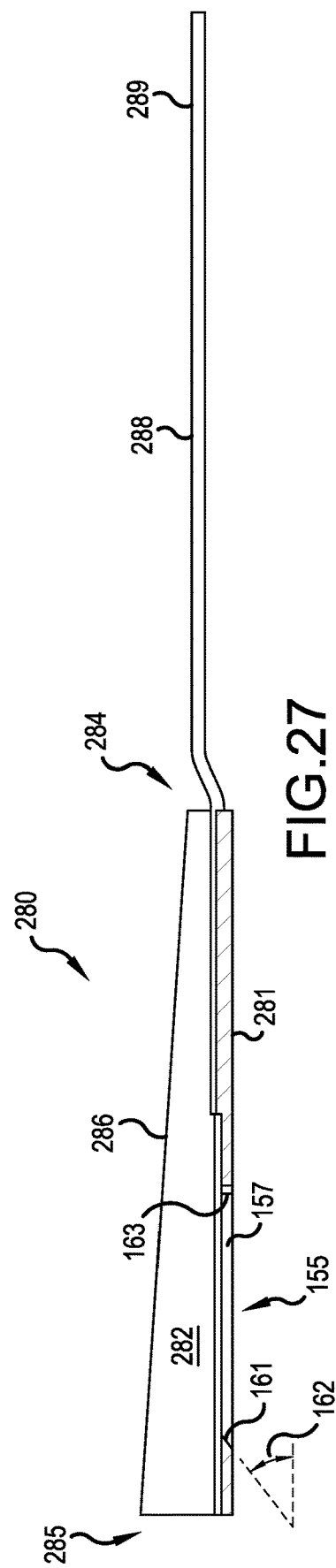

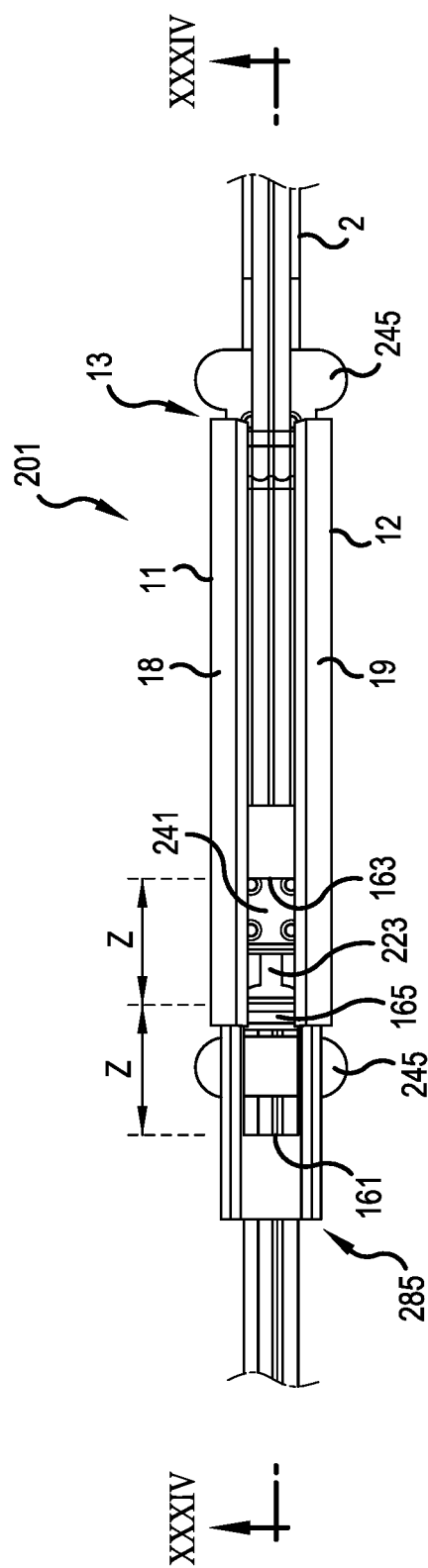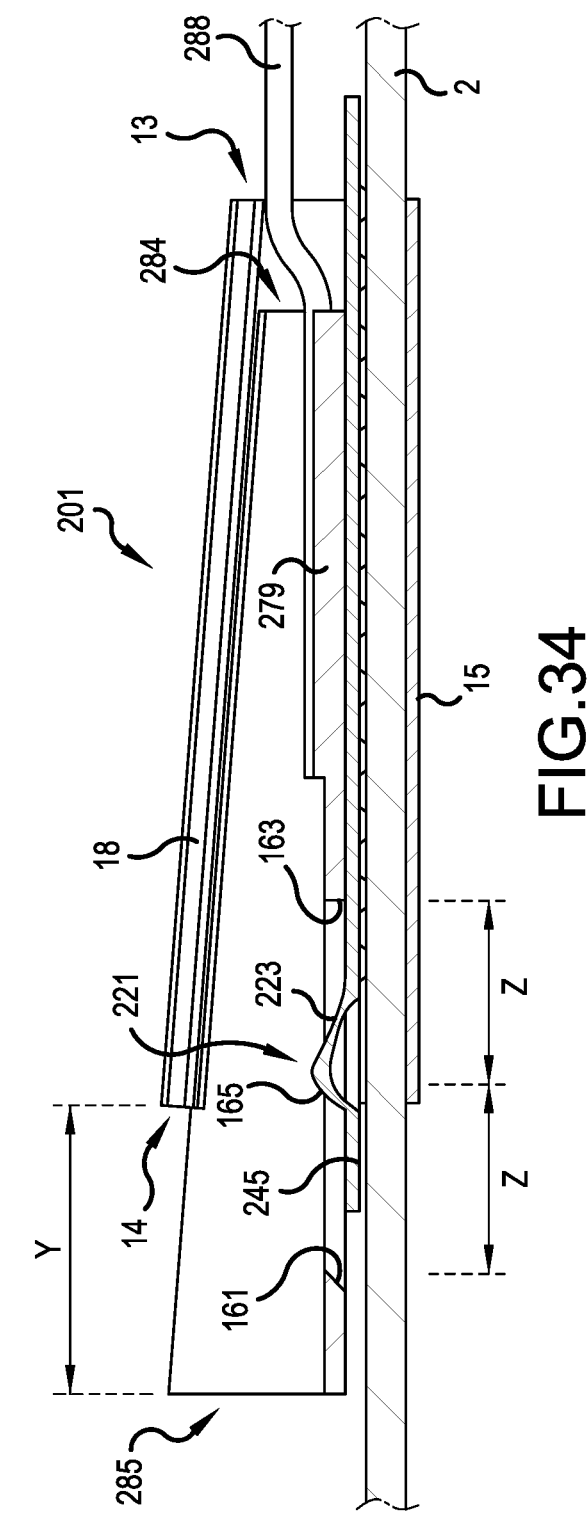

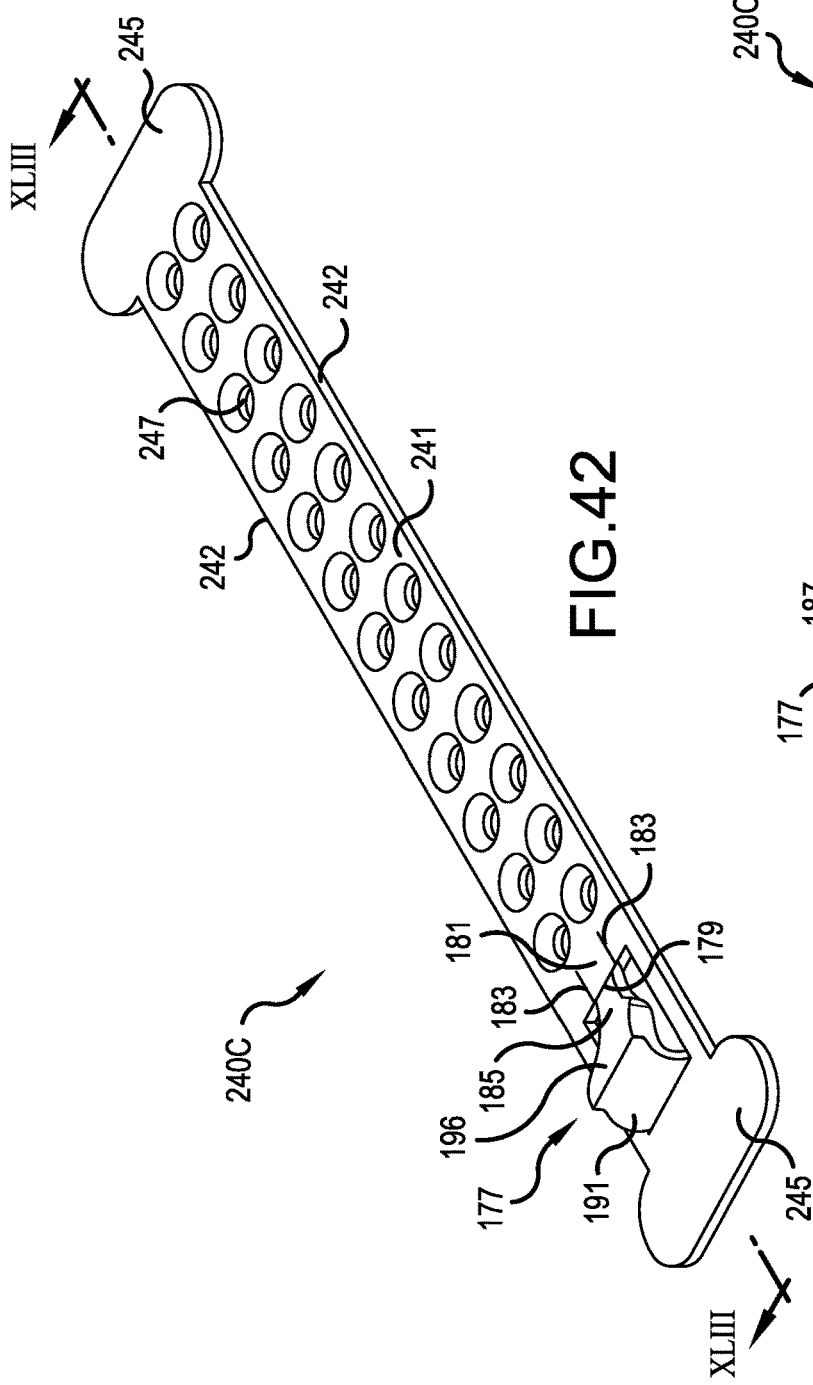
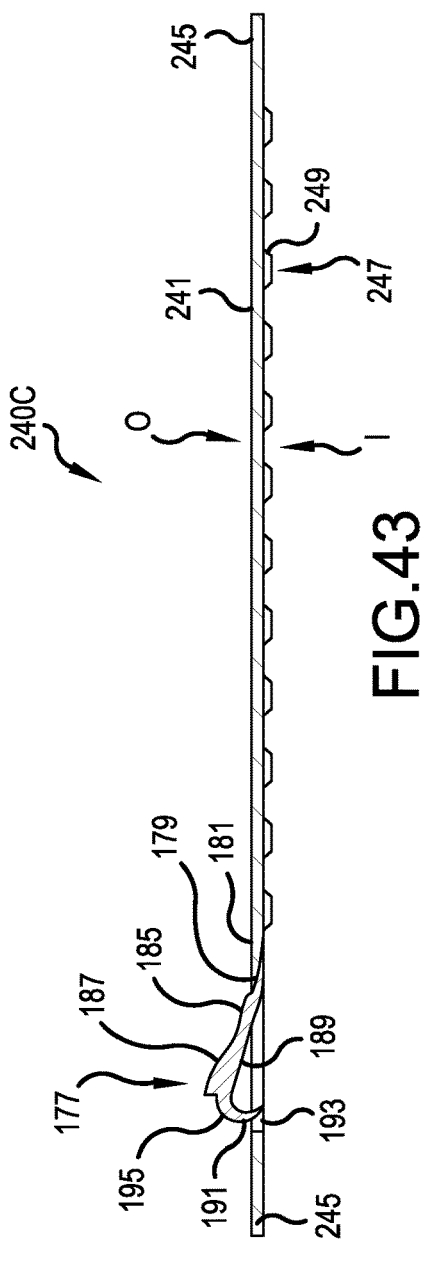
FIG.42
FIG.43

DROP CABLE CLAMP WITH CONTROLLED CABLE CUTTING FEATURE

This application is a continuation of International Application No. PCT/US2021/012382, filed Jan. 6, 2021, which claims the benefit of U.S. Provisional Application No. 62/983,492, filed Feb. 28, 2020 and U.S. Provisional Application No. 62/958,274, filed Jan. 7, 2020, all of which are herein incorporated by reference.

BACKGROUND OF THE INVENTION

1. Field of the Invention

The present invention relates to a cable clamp to support a weight of an aerial span of cable. More particularly, the present invention relates to a cable clamp in combination with a knife to cut the supported cable, if an axial load of the cable, as presented to the cable clamp, exceeds a threshold level.

2. Description of the Related Art

A cable clamp is known in the prior art. The primary function of the cable clamp is to support the weight of the aerial span of the cable without kinking or bending the cable within the cable clamp by distributing a holding force over a section of cable. The section of cable is frictionally engaged by the cable clamp in a manner so as not to damage the section of cable, e.g., not tear or cut an insulation jacket of the cable. The cable clamp is anchored to a sturdy structure like a wall or pole by an anchored bolt or the like.

The cable clamp also functions as a strain relief, so that the weight of the aerial span of the cable is not axially transferred to portions of the cable downstream of the cable clamp, which could kink and bend the cable and cause damage to the communication mediums therein. Also, if the axial strain were transferred downstream of the cable clamp, the strain could cause a terminated end of the cable to separate from a connector, or could cause the downstream cable to deform a grommet, caulk, or other water blocking structure that prevents water from following along the cable and entering a building or aperture in a surface wall of an equipment enclosure.

Various cable clamps are known in the prior art and are marketed by companies, such as MacLean Senior Industries and Allied Bolt, Inc. U.S. Pat. Nos. 6,581,251 and 8,517,317 to Allied Bolt, Inc., which are herein incorporated by reference, will now be described in conjunction with prior art FIGS. 1-10. FIG. 1 is a perspective view of a clamp 1 of the prior art. The clamp 1 is provided with a shell 10, a shim 40, and a wedge 80. The shell 10, shim 40, and wedge 80 cooperate together to secure a cable 2 between the shell 10 and the shim 40. The wedge 80 is longitudinally insertable into the shell 10 and above the shim 40. The wedge 80 can bias the shim 40 against the cable 2 towards the shell 10 to keep the cable 2 in a desired locked position by a frictional force.

The shell 10 includes a first shell sidewall 11, a second shell sidewall 12, a first end 13 and a second end 14, as provided in FIG. 1. The sidewalls 11 and 12 increase in height along the longitudinal length of the shell 10 from the first end 13 to the second end 14. The first shell sidewall 11 and the second shell sidewall 12 are substantially the same and mirror images of each other. Thus, at the first end 13, the first shell sidewall 11 and the second shell sidewall 12 have the same height H1, as provided in FIG. 2 (which is a cross sectional view taken from the perspective of line II-II in FIG. 1, but with the wedge 80, shim 40 and cable 2 removed so as to show only the shell 10). At the second end 14, the shell sidewalls 11 and 12 have the same height H2, as provided in FIG. 3 (which is an end view taken from the perspective of line III-III in FIG. 1, but with the wedge 80, shim 40 and cable 2 removed so as to show only the shell 10).

The shell 10 has a shell base 15 positioned between the shell sidewalls 11 and 12. The shell base 15 and the shell sidewalls 11 and 12 make an approximate U-shaped configuration to form a cable channel 9. As best seen in FIGS. 4 and 4A, an inside surface of the shell base 15 can include an inner friction engaging surface 16 to engage the cable 2 and enhance the frictional coefficient between the cable 2 and the shell base 15 when the cable 2 resides in the cable channel 9. The inner friction engaging surface 16 includes teeth 16A. The teeth 16A will grip to the jacket of the cable 2 to prevent the cable 2 from easily slipping in the direction from the first end 13 toward the second end 14 of the shell 10.

Tops of the first and second shell sidewalls 11 and 12 include inwardly bent ends which form respective guide channels 18 and 19. The guide channels 18 and 19 have a downward-facing, approximately U-shaped cross-section. The shell 10 receives the cable 2 between the first shell sidewall 11 and the second shell sidewall 12, as shown in FIG. 5.

The shim 40 is best seen in FIGS. 6 and 7. The shim 40 has an inside surface I that engages with the cable 2 and an outside surface O that engages with the wedge 80. The shim 40 includes an elongate shim base 41 having a center longitudinal axis. The shim base 41 is substantially rectangular. In one embodiment, the width of the elongate shim base 41 is greater than the distance between the inner flanges of the guide channels 18 and 19 to prevent the shim 40 from easily dislodging from the shell 10 when only the shim 40 resides within the shell 10.

The shim 40 has longitudinal sides 42, a first end 43 and a second end 44, as shown in FIG. 6. End sections 45 are coupled to the first end 43 and the second end 44 of the shim 40. The end sections 45 have substantially smooth inner surfaces to prevent damage to the cable.

The shim 40 makes substantially an "I" formation with the positioning of the shim base 41 between the end sections 45. With a slight tilt, the shim 40 passes between the inner flanges of the guide channels 18 and 19 and then lies flat on the shell base 15 within the shell sidewalls 11 and 12. The end sections 45 in combination with the shim base 41 create inner corners 50 of the "I" formation. The end sections 45 fit outside the dimensions of the shell 10, so that the corners 50 create a stop abutment to capture the shim 40 within the shell 10, i.e., the corners 50 prevent the shim 40 from sliding out of the shell 10 longitudinally.

The shim base 41 can also include a friction engaging surface to increase a friction coefficient between the cable 2 and the shim base 41. The friction engaging surface is located on the inside surface I of the shim base 41 as seen in FIG. 7. The shim base 41, as depicted in FIGS. 6 and 7, includes a plurality of holes 47 with raised edges 49 surrounding the holes 47 on the inside surface I of the shim 40. The raised edges 49 face and engage the cable 2, and also face, but do not engage, the inner friction engaging surface 16 of the shell 10.

The wedge 80 is separately depicted in FIGS. 8 and 9. The wedge 80 is longitudinally insertable into the shell 10 in the direction of arrow A, in FIGS. 1 and 10. The wedge 80 is positioned above the shim 40 to bias the shim 40 against the cable 2 and towards the shell base 15 of the shell 10. The wedge 80 includes a wedge base 81, a first wedge sidewall 82 and a second wedge sidewall 83. The wedge base 81 is positioned between the first and second wedge sidewalls 82 and 83. The wedge base 81 and the wedge sidewalls 82 and 83 make an upward facing, approximately U-shaped configuration.

The first and second wedge sidewalls 82 and 83 increase in height along the length of the wedge 80 from a first end 84 to a second end 85 of the wedge 80. The first and second wedge sidewalls 82 and 83 are substantially the same and mirror images of each other. Thus, at the first end 84, the first wedge sidewall 82 and the second wedge sidewall 83 have the same shorter height and at the second end 85 of the wedge 80, the first and second wedge sidewalls 82 and 83 have the same taller height.

The first and second wedge sidewalls 82 and 83 each include a top 86 insertable into a respective one of the guide channels 18 and 19 of each shell sidewall 11 and 12, respectively. The inner flanges of the guide channels 18 and 19 of the shell 10 keep the tops 86 of the first and second wedge sidewalls 82 and 83 secure within the guide channels 18 and 19, respectively.

As best seen in FIG. 10, the first end 84 of the wedge 80 is insertable into the second end 14 of the shell 10, so that the shorter height of the wedge 80 fits into the larger height H2 of the shell 10. The wedge base 81 slides along the outside surface O of the shim 40. As the wedge 80 is pulled further into the shell 10 in the direction of arrow A in FIGS. 1 and 10, the wedge base 81 increasingly biases the shim 40 toward the shell base 15 of the shell 10 to sandwich the cable 2 between the shim 40 and the shell base 15. A hammer can be used to tap the wedge 80 into the shell 10 above the shim 40 to fully secure the cable 2 in the clamp 1. Alternatively, the wedge 80 can be pulled into the shell 10 using a tail wire 88 with a loop 89. The tail wire 88 is strongly secured to the wedge base 81 by multiple crimps 79, welds or the like.

When the wedge 80 is slid in the direction of arrow A and pushed or pulled tightly, the cable 2 is sandwiched between the shim 40 and the shell base 15 of the shell 10. The raised edges 49 of the holes 47 of the shim 40 slightly grip into the outer upper surface of a jacket of the cable 2, and the teeth 16A of the shell base 15 slightly grip into the outer bottom surface of the jacket of the cable 2. The raised edges 49 and teeth 16a produce a very large coefficient of friction over an extended length of the cable 2 to cause the cable 2 to be essentially fixed to the clamp 1, as if adhered to the clamp 1. The cable 2 will not easily slip within the clamp 1. More precisely, the weight of an aerial span of the cable 2 will not cause the cable 2 to slip in the direction opposite to arrow A in FIGS. 1 and 10 relative to the clamp 1.

The cable clamp 1 is designed to hold the cable 2 and to prevent the cable 2 from slipping therethrough. If the cable 2 is allowed to slip within the clamp 1, the aerial span of the cable 2 will sag, and the length of the downstream portion of the cable 2, i.e., the portion of the cable 2 between the clamp 1 and the building and equipment connected to the cable 2, will decrease, which may place a kink in the cable or tension on downstream connectors and damage equipment and/or disconnect the cable 2 from downstream equipment.

Such cable clamps have been widely deployed and have gained acceptance in the market. Other examples of known cable clamps are shown in U.S. Patent and U.S. Pat. No. 5,226,216; 2004/0035984 and 2005/0254768, each of which is herein incorporated by reference.

SUMMARY OF THE INVENTION

If the aerial span of the cable is contacted by an external force, such as by contacting a tall truck or recreational vehicle (RV) or even rooftop mounted bicycles, canoes or suitcases, the force applied to the cable is excessive. In some cases, the cable may sever, typically at the clamp. In other cases, the clamp itself may break apart. In other cases, the clamp may remain intact and sever from the sturdy structure, e.g., the anchor bolt holding the loop 89 of the clamp 1 is pulled free from the study structure.

Sometimes, the cable, cable clamp, and clamp anchoring system are all so strong that the study structure is pulled toward the roadway, e.g., a roadside pole is bent or broken. To this end, a breakaway coupler 100 is on the market to be installed between the cable clamp mount, e.g., the loop 89 of FIGS. 8-10 and the sturdy structure. See U.S. Pat. Nos. 4,687,365; 5,599,129 and 7,290,748, as well as, the attached Appendix A entitled "CommScope®, Over Head Communications Lines Mechanical Breakaway System." The breakaway coupler 100 has a shear pin which breaks at a preset load, e.g., two hundred pounds, four hundred pounds. As noted in Appendix A, the breakaway coupler 100 is designed to save the pole because a pole replacement or pole repair can be very costly.

FIG. 11 shows a roadway 101, which has a first pole 103 and a second pole 105 located on opposite sides of the roadway 101. A cable 2 has an aerial span 107 across the roadway 101. The weight of the aerial span 107 is supported by first and second clamps 1A and 1B.

The first clamp 1A is attached to the first pole 103 by a first breakaway coupler 100A. The second clamp 1B is attached to the second pole 105 by a second breakaway coupler 100B. The downstream portion of the cable 2 (i.e., the portion leading away from the roadway 101 from the second clamp 1B) includes several loops 109. An end of the downstream cable 2 is terminated to a connector 111, which is mated to a piece of equipment 113 mounted to the second pole 105. The several loops 109 of cable 2 are provided in case the equipment 113 is replaced or moved in the future and the connection port(s) of the new equipment is located in a more remote location. Typically, the loops are loosely secured by a ratcheting tie, hook and loop fastener or windings of electrical tape and the loops 109 are secured or hung on the second pole 105.

If a tall truck 115 makes contact with the aerial span 107 of the cable 2, an excessive force will be applied to the cable 2. One of the first and second breakaway couplers 100A and 100B will disconnect first, even if both of the first and second breakaway couplers 100A and 100B are set to the same breakaway force, like 1,800 Newtons (about 400 pounds). In FIG. 12, an instance where the second breakaway coupler 100B has disconnected first is illustrated. A first part 100B' of the second breakaway coupler 100B is still attached to the top of the second pole 105. A second part 100B" of the second breakaway coupler 100B is located on the ground.

When the second breakaway coupler 100B separates into the first and second parts 100B' and 100B", the loops 109 of the cable 2 are quickly pulled free allowing additional slack to the aerial span 107. Next, the excess force encounters resistance from the remaining, first breakaway coupler 100A and the connector 111 mated to the port of the equipment 113. Either the first breakaway coupler 100A will separate or something will break apart at the equipment 113 depending upon which is the weakest link.

Hopefully, the connector 111 will simply pull out of the port of the equipment 113 or the cable 2 will pull out of the connector 111. However, depending upon the cable and the connector orientations those attachments may be rather strong. For example, a compression type F-connector which is threaded onto a port 111 of the equipment 113, where the cable 2 extends at about a ninety degree angle away from the axis of the port of the equipment 113 may be a stronger connection than the outer face plate and underlying circuit boards within the equipment 113.

FIG. 12 shows the equipment 113 having a first piece 113' of the equipment 113 still attached to the second pole 105 and a second piece 113" of the equipment 113 with the port 111 still attached to the terminated end of the cable 2 lying on the ground. This might occur if the force to pull the front face off of the equipment 113 is less than the force needed to separate the first breakaway coupler 100A, e.g., less than 1800 Newtons (about 400 pounds). The equipment 113 can be rather expensive, such as a supplemental small cell site.

FIG. 13 illustrates a rare but potentially deadly scenario wherein contact with the aerial span 107 of the cable 2 by a vehicle has disconnected one of the breakaway couplers 100A or 100B, e.g., the second coupler 100B, but then the cable 2 passes free of the vehicle either over it or under it, and remains intact and attached to the other breakaway coupler 100B or 100A, e.g., the first breakaway coupler 100A, and the connector 111 remains connected to the port 111 of the equipment 113. The aerial span 114 is now much lower than intended by the original design, i.e., the aerial span 107 of FIG. 11. If a motorcyclist 117 or bicyclist contacts the lowered aerial span 114, a potentially deadly accident could occur.

The Applicant has designed a new cable clamp which cuts the cable when an excess axial force is transferred from the cable to the cable clamp. Once the cable is cut it is much more likely to lie flat on the ground and not cause the potentially dangerous situation depicted in FIG. 13. Moreover, use of the new cable clamp can replace the need for the breakaway couplers 100A and 100B, which can cost more than ten times the price of a typical cable clamp.

These and other objects are accomplished by a cable clamp comprising: a shell having a shell base and first and second sidewalls connected to said shell base, said shell base, first sidewall and second sidewall forming a cable channel therebetween extending in a first direction to receive a length of cable therein; a wedge residing between said first and second sidewalls with a wedge base facing to said shell base, wherein movement of said shell relative to said wedge causes the cable to engage more tightly between said wedge base and said shell base; and a blade element residing between said wedge base and said shell base, wherein said blade element includes a blade base and a cutting portion with a cutting edge, and wherein said cutting edge faces toward the cable.

Moreover, these and other objects are accomplished by a cable clamp comprising: a shell means forming a channel extending in a first direction for receiving a length of cable therein; a wedge means for residing within said channel, wherein movement of said shell means relative to said wedge means causes the cable to engage more tightly between said wedge means and said shell means; and a blade means residing between said wedge means and said shell means, wherein said blade means is for cutting the cable in response to an excessive axial force along the first direction being applied to the cable within the channel.

Further, these and other objects are accomplished by a method of installing a cable within a cable clamp comprising: providing a shell having a shell base and first and second sidewalls connected to the shell base, the shell base, first sidewall and second sidewall forming a channel therebetween extending in a first direction; inserting a length of the cable into the channel of the shell adjacent to the shell base; installing a blade element into the channel; positioning a cutting edge of the blade element to face the cable; inserting a wedge into the shell with a wedge base facing the cable; and sliding the shell and the wedge relative to each other to cause the cable to engage more tightly between the wedge base and the shell base and create a frictional engagement along a length of the cable in the channel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 24 is a rear, bottom perspective view of a wedge, in accordance with the present invention;

FIG. 25 is a bottom view of the wedge of FIG. 24;

FIG. 26 is a rear, top perspective view of the wedge of FIGS. 24 and 25;

FIG. 27 is a cross sectional view taken along line XXVII-XXVII in FIG. 26;

FIG. 33 is a top view of the cable clamp of FIG. 32;

FIG. 34 is a cross sectional view taken along line XXXIV-XXXIV in FIG. 33;

FIG. 42 is a top perspective view of a shim, in accordance with a fourth embodiment of the present invention;

FIG. 43 is a cross sectional view taken along line XLIII-XLIII in FIG. 42;

DETAILED DESCRIPTION OF EMBODIMENTS OF THE INVENTION

Figure 1:
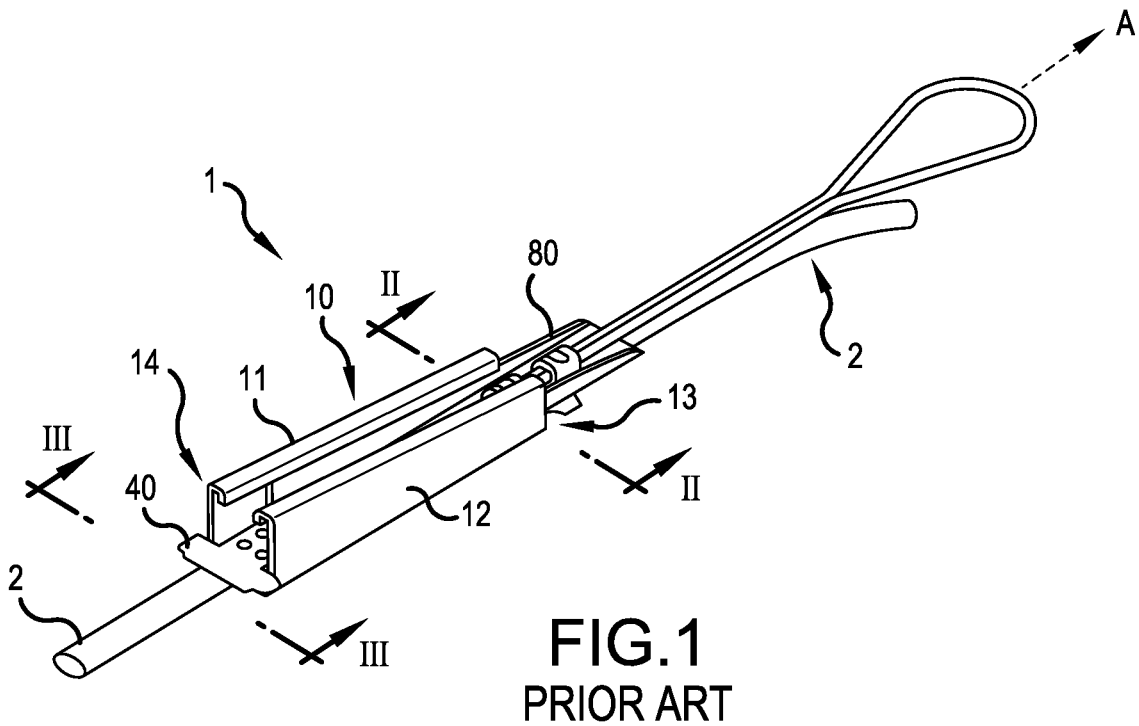
FIG. 1 is a perspective view of a cable clamp, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 14:
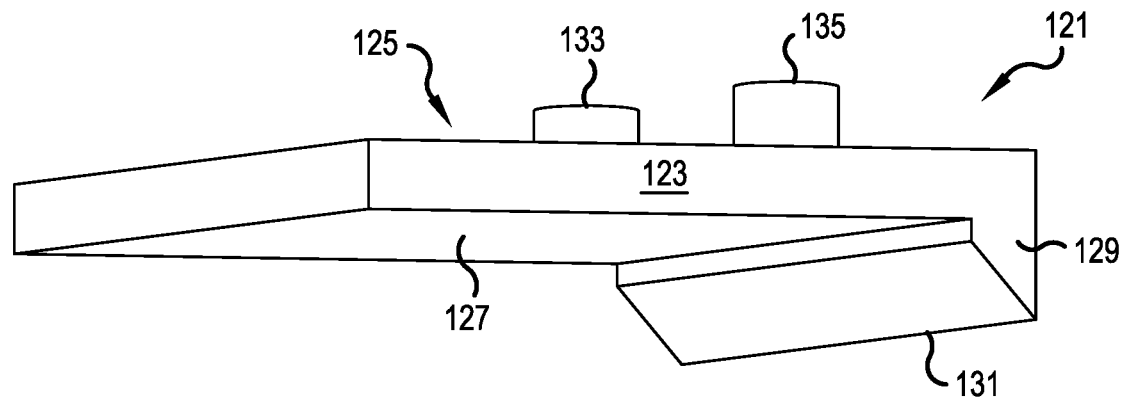
FIG. 14 is a perspective view of a blade element in accordance with a first embodiment of the present invention.
Figure 15:
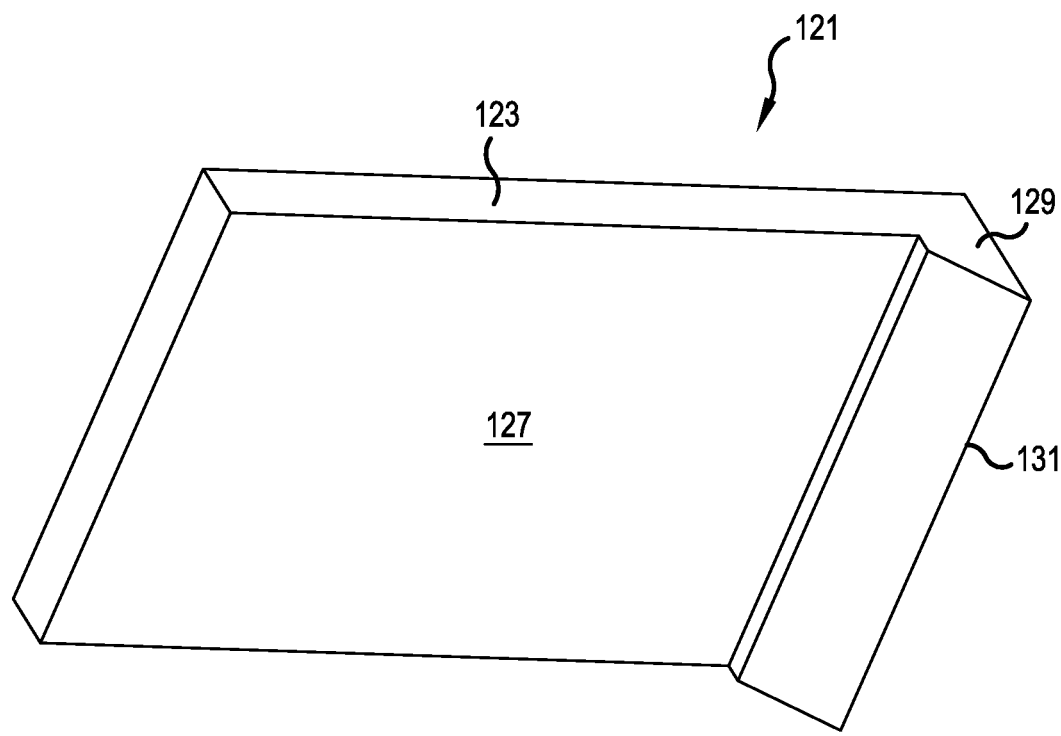
FIG. 15 is a bottom perspective view of the blade element of FIG. 14.
Figure 16:
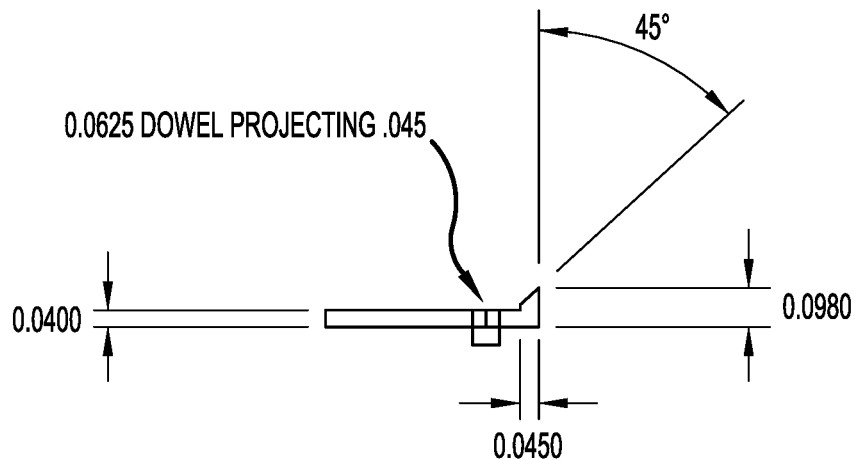
FIG. 16 is a side view of the blade element of FIGS. 14-15 with one example of potential dimensions.
Figure 17:
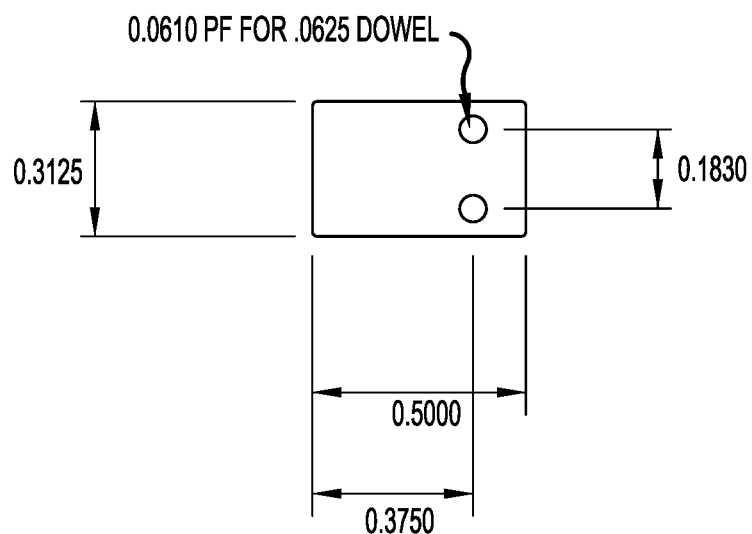
FIG. 17 is a top view of the blade element of FIGS. 14-15 with one example of potential dimensions.

FIG. 14 is a top perspective view of a blade means or blade element 121 and FIG. 15 is a bottom perspective view of the blade element 121, in accordance with a first embodiment of the present invention. The blade element 121 includes a blade base 123 with a top side 125 and a bottom side 127. A cutting portion 129 with a cutting edge 131 extends away from the blade base 123 on the bottom side 127. The top side 125 of the blade base 123 includes at least one projection, such as first and second projections 133 and 135, extending away therefrom. FIGS. 16 and 17 show example dimensions, in inches, for the various features of the blade element 121. It should be noted that the dimensions may be varied to accommodate differently sized cable clamps and differently sized cables, as well as to cause the blade assembly to sever a cable upon the application of different axial forces.

Figure 18:
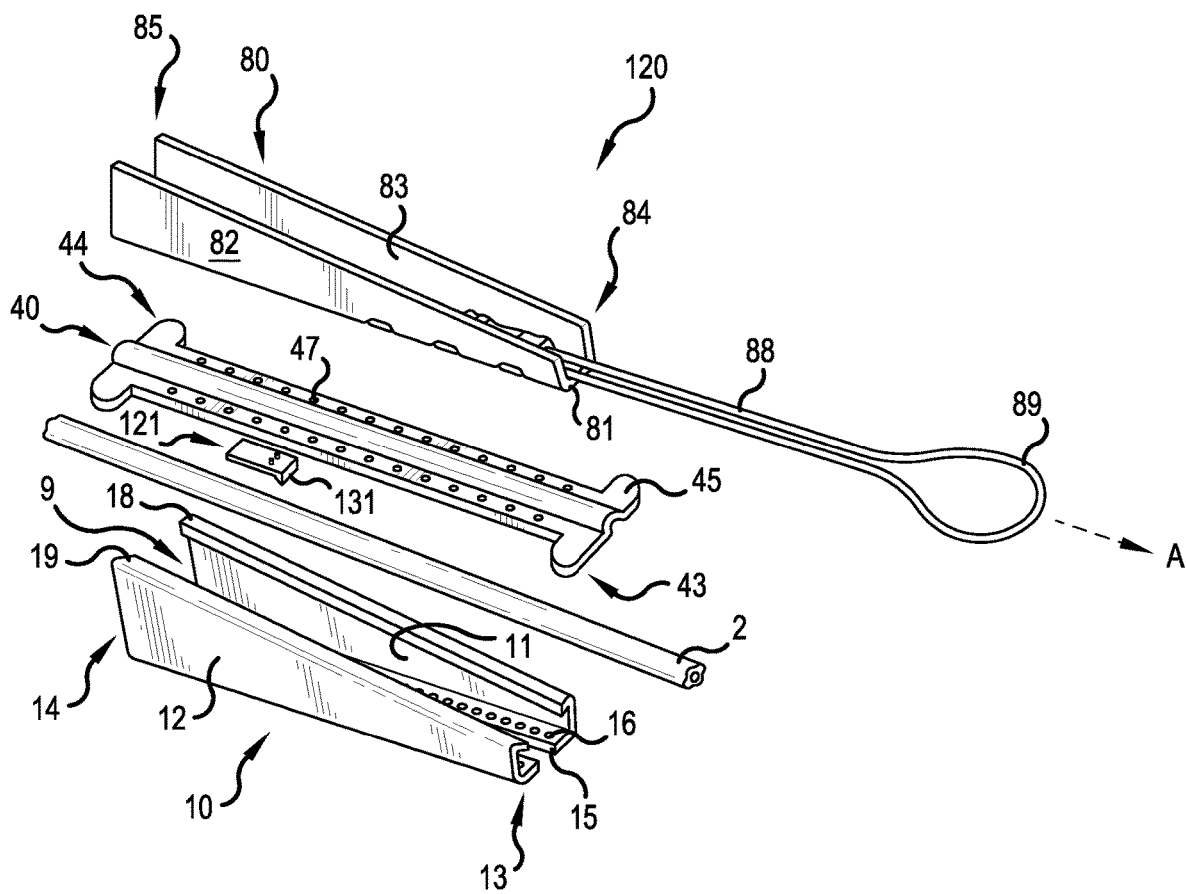
FIG. 18 is an exploded view of a cable clamp employing the blade element of FIGS. 14-17, in accordance with the present invention.

FIG. 18 shows the first embodiment of the blade element 121 located within a cable clamp 120. The cable clamp 120 has most of the features of the prior art cable clamp 1 of FIGS. 1-10. Like features have been labeled with the same reference numerals. For example, the cable clamp 120 includes a shell means, like the shell 10 having the shell base 15 and first and second sidewalls 11 and 12 connected to the shell base 15. The shell base 15, first sidewall 11 and second sidewall 12 form the channel 9 therebetween extending in the first direction A to receive the length of the cable 2 therein. The length of cable 2 extends along the first direction A and resides against the shell base 15 within the channel 9.

A wedge means, like the wedge 80 resides between the first and second sidewalls 11 and 12 and has the wedge base 81 facing to the shell base 15. The shim 40 resides between the wedge base 81 and the shell base 15, and the cable 2 fits between the shim 40 and the shell base 15. Movement of the wedge 80 relative to the shell 10 causes the cable 2 to engage more tightly between the shim 40 and the shell base 15.

Figure 6:
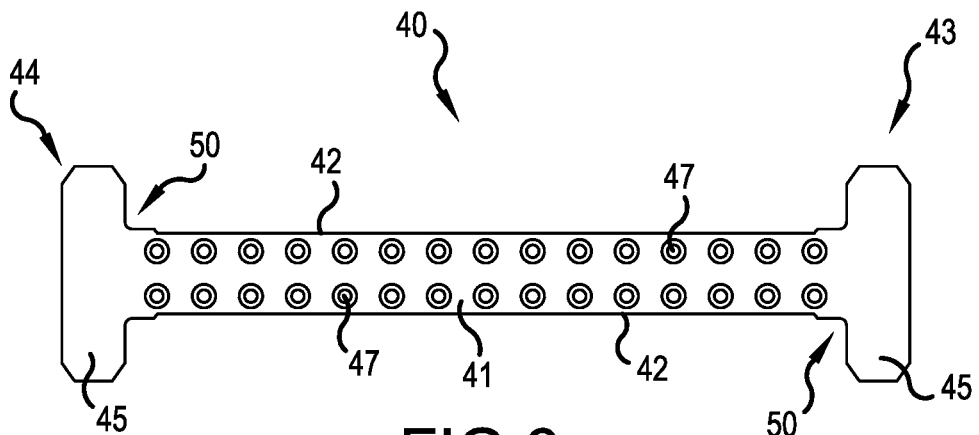
FIG. 6 is a top view of a shim of the cable clamp of FIG. 1.
Figure 7:
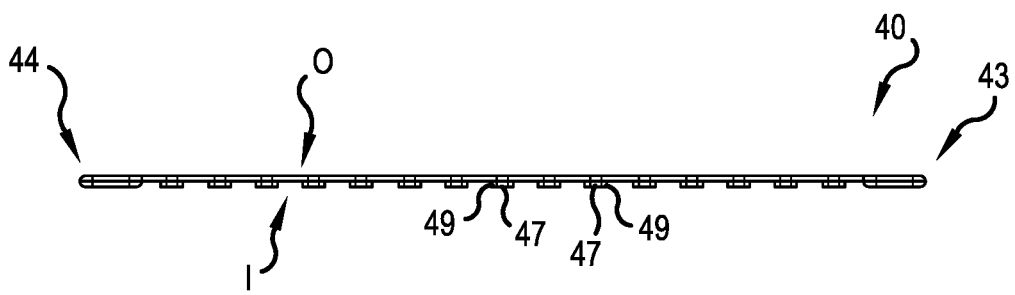
FIG. 7 is a side view of the shim of FIG. 6.

A side of the shim 40 facing the shell base 15 may include first friction enhancing elements to engage a jacket of the cable 2 in contact with the shim 40. The first friction enhancing elements may be holes 47 punched through the shim 40 so as to form raised edges 49 around the holes 47 on the inside surface I of the shim 40 facing the shell base 15, as best shown in FIGS. 6 and 7. Likewise, the shell base 15 may include second friction enhancing elements, like the teeth 16A, to engage the jacket of the cable 2 in contact with the shell base 15.

The first and second projections 133 and 135 are aligned and dimensioned to register within two of the holes 47 formed in a same row of the shim 40. Placing the first and second projections 133 and 135 into at the holes 47 in the shim 40 will fix a position of the blade element 121 relative to the shim 40. In the fixed position, the cutting edge 131 faces toward the cable 2, the blade base 123 extends in a second direction approximately parallel to the first direction A, and the cutting portion 129 extends in a third direction approximately perpendicular to the first direction A.

In a preferred embodiment, the Applicant discovered that a placement of the first and second projections 133 and 135 within the fifth row of holes 47 from the second end 44 of the shim 40 (the second end 14 of the shell 10) worked particularly well with severing Easy Access fiber cables produced by CommScope®, which include two FRP (fiber reinforced plastic) strength members. The placement in the fifth row of holes 47 caused the cutting edge 131 to sever the cable 2 at slightly less than 1,700 Newtons, e.g., the cable 2 was severed at between 1650 to 1690 Newtons. Placement in the sixth, seventh, eighth, etc. rows of holes 47 (closer to the first end 13 of the shell 10) caused the same cable to sever at lower axial forces on the cable, e.g., less than 1,650 Newtons, like 1,300 Newtons. Placement in the first through fourth rows of holes 47 (closer to the second end 14 of the shell 10) caused the same cable to sever at higher levels of axial force applied to the cable, e.g., greater than 1,700 Newtons, e.g., between 1,800 and 2,200 Newtons.

In the embodiment of FIG. 18, the blade element 121 resides between the shim 40 and cable 2 and the cutting edge 131 rests against the cable 2 and cuts the cable 2 if excessive force is applied on the cable 2 along the axis A to cause the wedge 80 to move slightly relative to the shell 10, or to cause the cable 2 to slip slightly relative to the cable clamp 120. If the blade rests directly on the jacket of the cable 2, it may be desirable to wrap the cable 2 with a few windings of electrical tape at the point of contact between the cutting edge 131 and the cable 2 so that normal vibrations due to wind, etc., do not damage the jacket, yet any strong axial force applied to the cable 2 will still cause the cutting edge 131 to cut through the tape and cable 2 to sever the cable 2.

Figure 19:
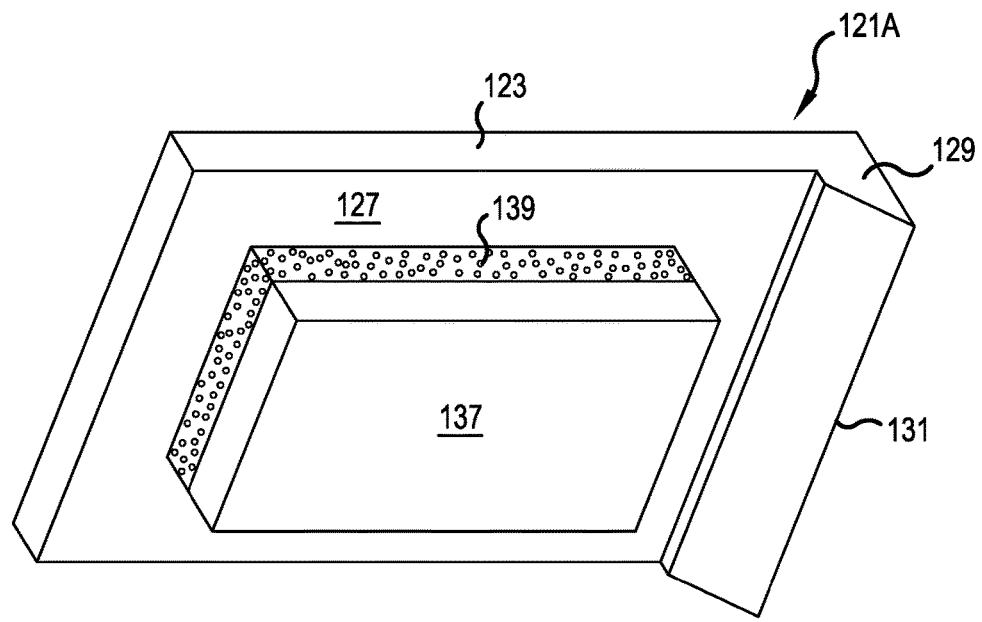
FIG. 19 is a bottom perspective view of a blade element in accordance with a second embodiment of the present invention.

FIG. 19 shows a second embodiment of the blade element 121A, wherein a compressible member 137 is attached, e.g., adhered, to the bottom side 127 of the blade base 123. The blade element 121A would be assembled into the cable clamp 120 in the same manner as depicted in FIG. 18. The compressible member 137 may be formed of a dielectric material which is foamed to form air pockets in at least a first layer 139 of the compressible member 137. Alternatively, the air pockets may be formed throughout the compressible member 137.

The compressible member 137 keeps the cutting edge 131 from resting against the jacket of the cable 2, while the blade element 121A resides between the shim 40 and cable 2. The normal clamping force applied upon the cable 2 by the cable clamp 120 does not fully compress the compressible member 137 and the cutting edge 131 is spaced from the cable 2. When an excessive force is applied to the cable 2, the wedge 80 will slightly move relative to the shell 10. The movement will further compress compressible member 137 so that the cutting edge 131 will pass into the cable 2 to cut the cable 2.

Figure 20:
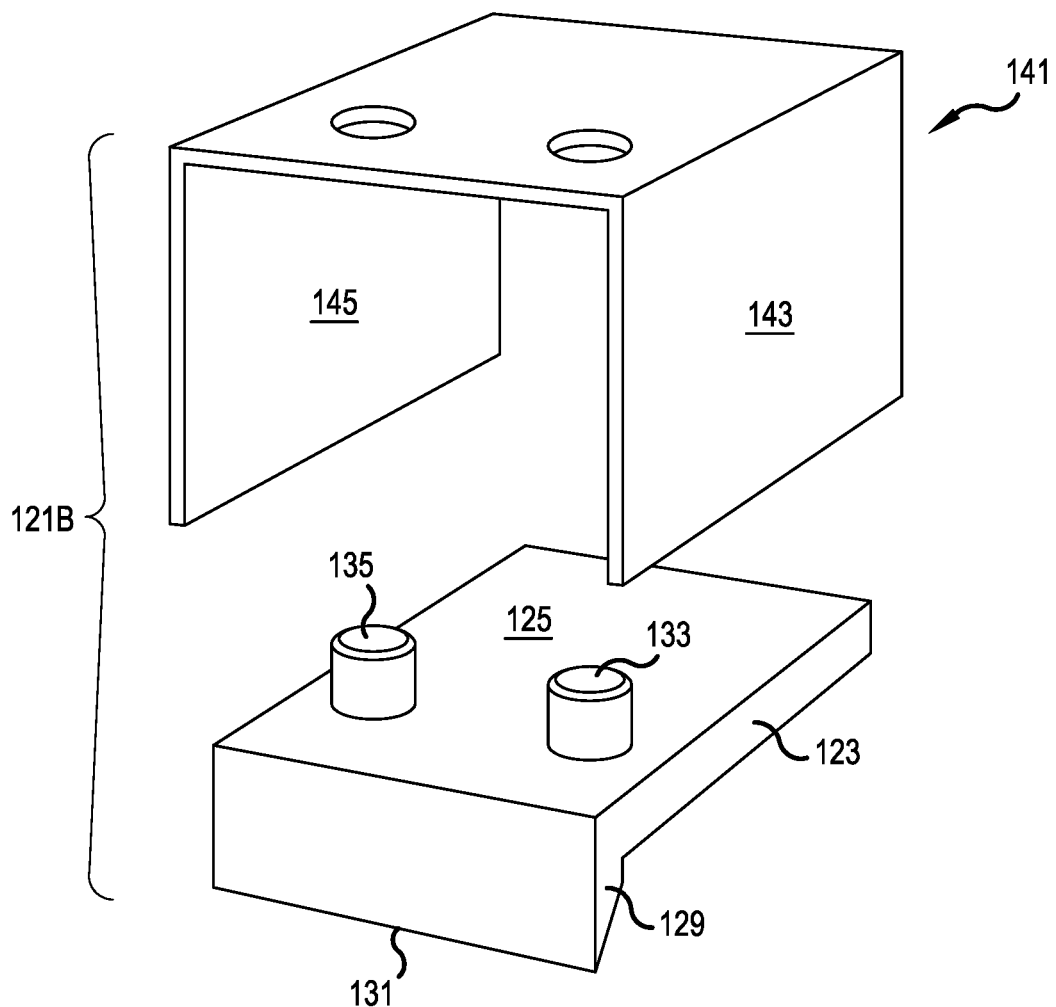
FIG. 20 is a top perspective view of a blade element in accordance with a third embodiment of the present invention.

FIG. 20 shows a third embodiment of the blade element 121B, wherein a frangible member 141 overlies the entirety of the blade base 123. The blade element 121B would be assembled into the cable clamp 120 in the same manner as depicted in FIG. 18. The frangible member 141 may be formed of a brittle plastic material to form a U-shaped hood with side legs 143 and 145, each with a height greater than the combined thickness of blade base 123 and cutting portion 129, e.g., greater than 0.098 inches, assuming the dimensions of FIG. 16.

The frangible member 141 keeps the cutting edge 131 from resting against the jacket of the cable 2, while the blade element 121 resides between the shim 40 and cable 2. The normal clamping force applied upon the cable 2 by the cable clamp 120 does not break or bend the frangible member 141 and the cutting edge 131 is spaced from the cable 2. When an excessive force is applied to the cable 2, the wedge 80 will slightly move relative to the shell 10. The movement will further compress the frangible member 141 causing its side legs 143 and/or 145 to break or bend so that the cutting edge 131 will pass into the cable 2 to cut the cable 2.

Figure 21:
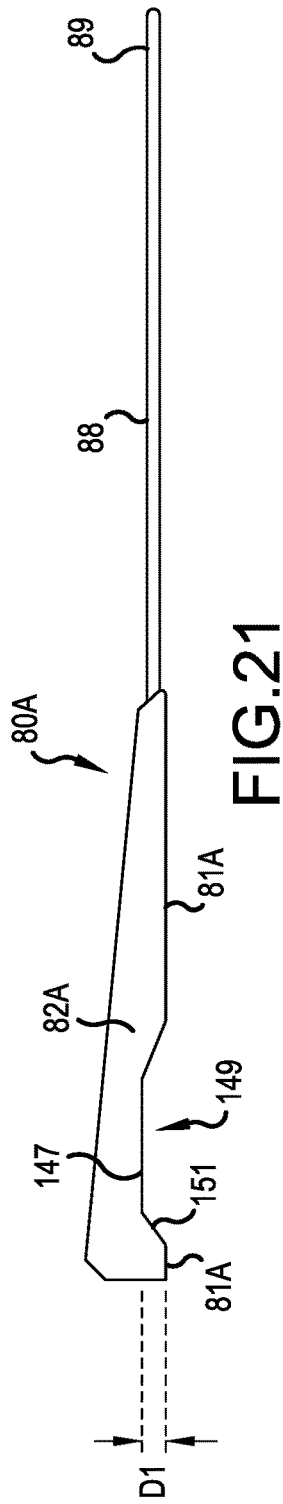
FIG. 21 is a side view of a second embodiment of a wedge, in accordance with the present invention.

FIG. 21 shows a modified wedge 80A. The modified wedge 80A includes a recessed area 147 formed in the first and second wedge sidewalls 82A and 83A. The wedge base 81A has an indented area 149 of a dimension D1. The dimension D1 is sufficient to hold the entirety of the blade element 121, e.g., greater that 0.098 inches assuming the dimensions of the blade element 121 of FIG. 16.

Figure 22:
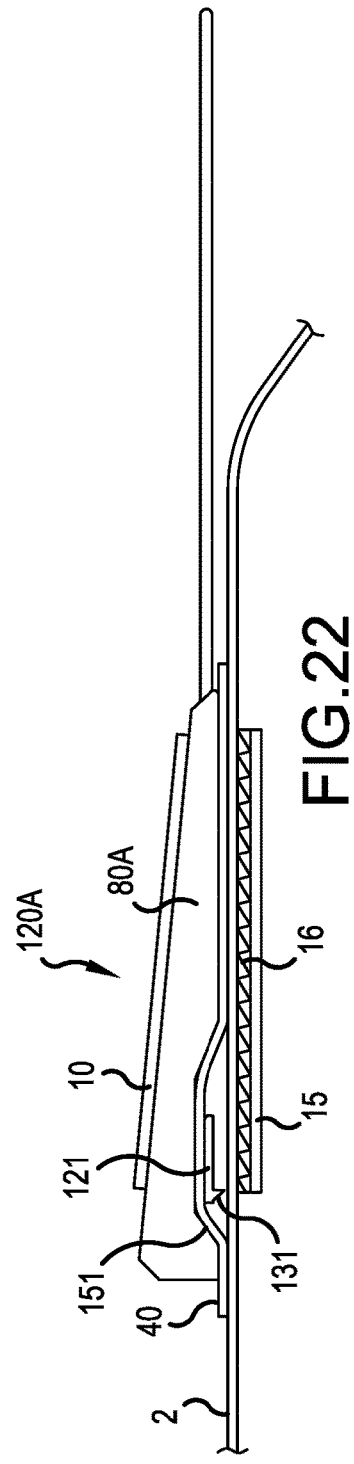
FIG. 22 is a side view of the wedge of FIG. 21 inserted into a cable clamp, in accordance with the present invention.

FIG. 22 shows the blade element 121 assembled into the cable clamp 120A in the same manner as depicted in FIG. 18. The indented area 149 keeps the cutting edge 131 from resting against the jacket of the cable 2, while the blade element 121 resides between the shim 40 and cable 2. The normal clamping force applied upon the cable 2 by the cable clamp 120A does not move the blade element 121 out of the indented area 149. When an excessive force is applied to the cable 2, the shell 10 will slightly move relative to the wedge 80. The movement will cause the blade element 121 to ride up a ramp 151. As the blade element 121 rides up the ramp 151, the cutting edge 131 will move downwardly, as shown in FIG. 23 to pass into the cable 2 to cut the cable 2.

Figure 23:
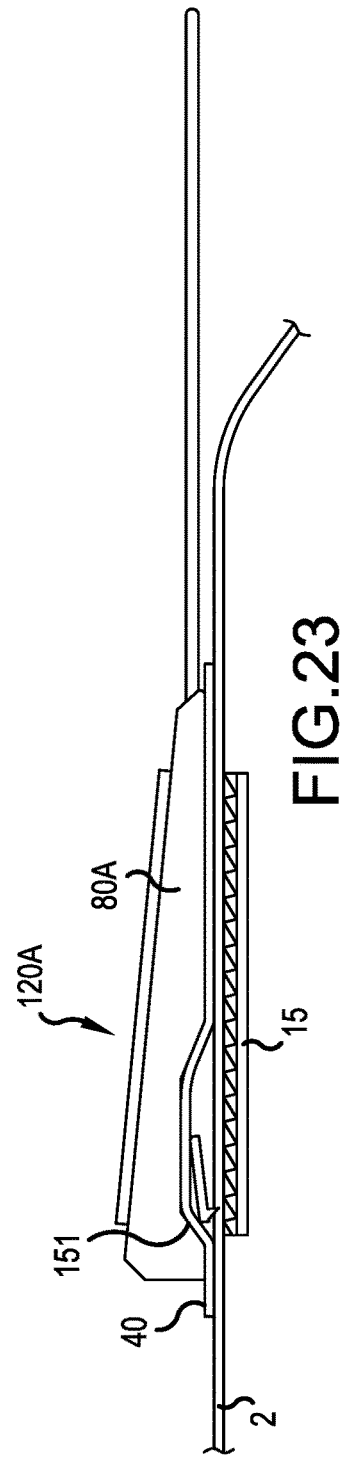
FIG. 23 is a side view of the cable clamp of FIG. 22 after an excessive axial force has been applied to a cable within the cable clamp and the cable is being cut by the blade element.

The blade 121 depicted in FIGS. 22-23 is slightly different as compared to the blade 121 depicted in FIGS. 14-18. The blade 121 of FIGS. 22-23 has the cutting portion 129 reconfigured. The angled sidewall and the perpendicular sidewall, each leading to the cutting edge 131, are reversed in position. It has been found that the cable cut is cleaner when the cable 2 is pulled into the perpendicular sidewall leading to the cutting edge 131. In other words, when the cable 2 of FIG. 18 is pulled in the direction opposite to arrow A, the perpendicular edge of the cutting portion 129 faces the moving cable 2 and cleanly cuts the cable 2. If the angled sidewall faces the moving cable 2, the cable 2 is not as cleanly cut and an insulation layer tends to strip or roll back prior to the severing of the cable 2. FIGS. 22-23 demonstrate that the blade base 123 can be flipped to the other side of the cutting portion 129, while keeping the perpendicular sidewall of the cutting portion 129 facing the moving cable for a clean cut. The blade 121 of FIGS. 14-18 may be used in the embodiment of FIGS. 22-23 and other orientations of the blade 121 are also possible.

FIGS. 24-27 show an inventive wedge 280 in accordance with the present invention. The new wedge 280 is similar to the prior art wedge 80 of FIGS. 8 and 9, but is modified on its wedge base 281. The wedge 280 is longitudinally insertable into the prior art shell 10 in the direction of arrow A, in FIGS. 1 and 10. The wedge 280 includes the wedge base 281, a first wedge sidewall 282 and a second wedge sidewall 283. The wedge base 281 is positioned between the first and second wedge sidewalls 282 and 283. The wedge base 281 and the wedge sidewalls 282 and 283 make an upward facing, approximately U-shaped configuration.

The first and second wedge sidewalls 282 and 283 increase in height along the length of the wedge 280 from a first end 284 to a second end 285 of the wedge 280. The first and second wedge sidewalls 282 and 283 are substantially the same and mirror images of each other. Thus, at the first end 284, the first wedge sidewall 282 and the second wedge sidewall 283 have the same shorter height and at the second end 285 of the wedge 280, the first and second wedge sidewalls 282 and 283 have the same taller height.

Figure 8:
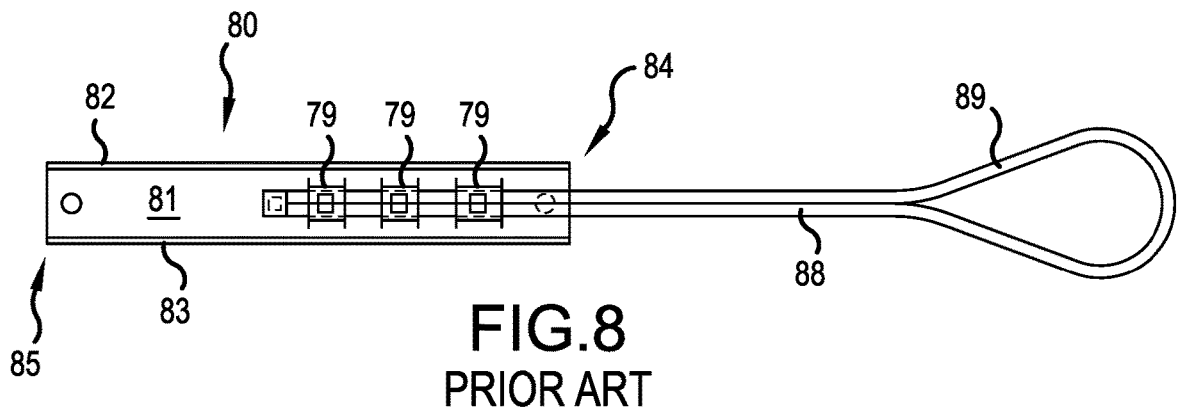
FIG. 8 is a top view of a wedge of the cable clamp of FIG. 1.
Figure 9:
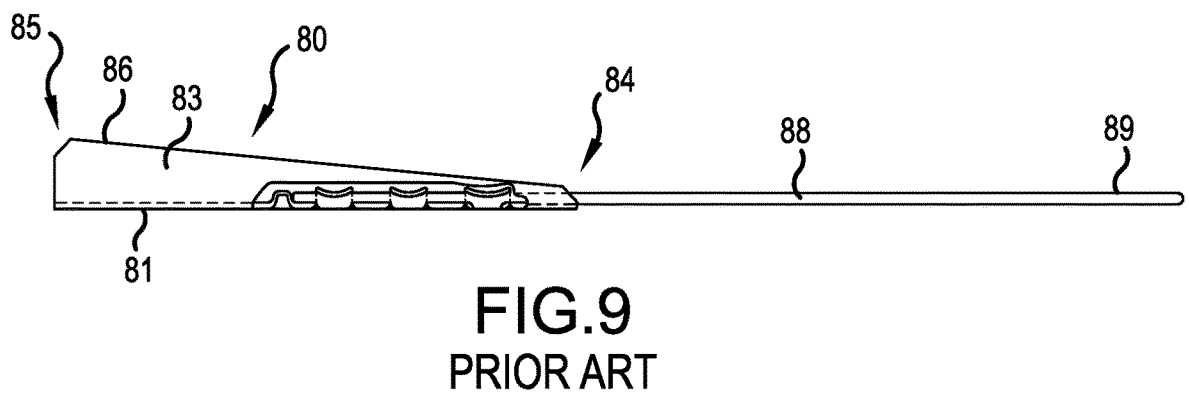
FIG. 9 is a side view of the wedge of FIG. 8.
Figure 10:
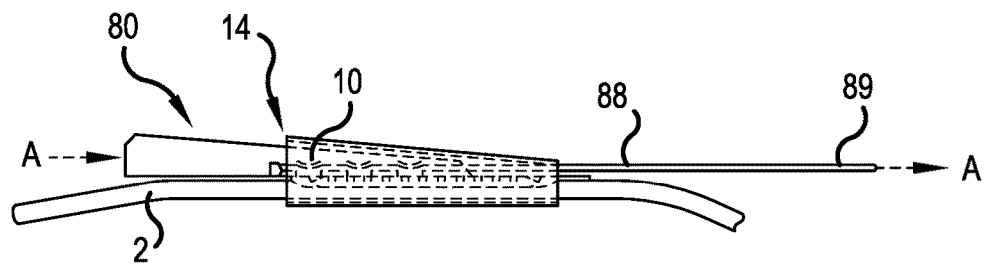
FIG. 10 is a side view of the shim of FIG. 7 residing on the cable of FIG. 5, and the wedge of FIG. 9 inserted into the shell of FIG. 5.
Figure 11:
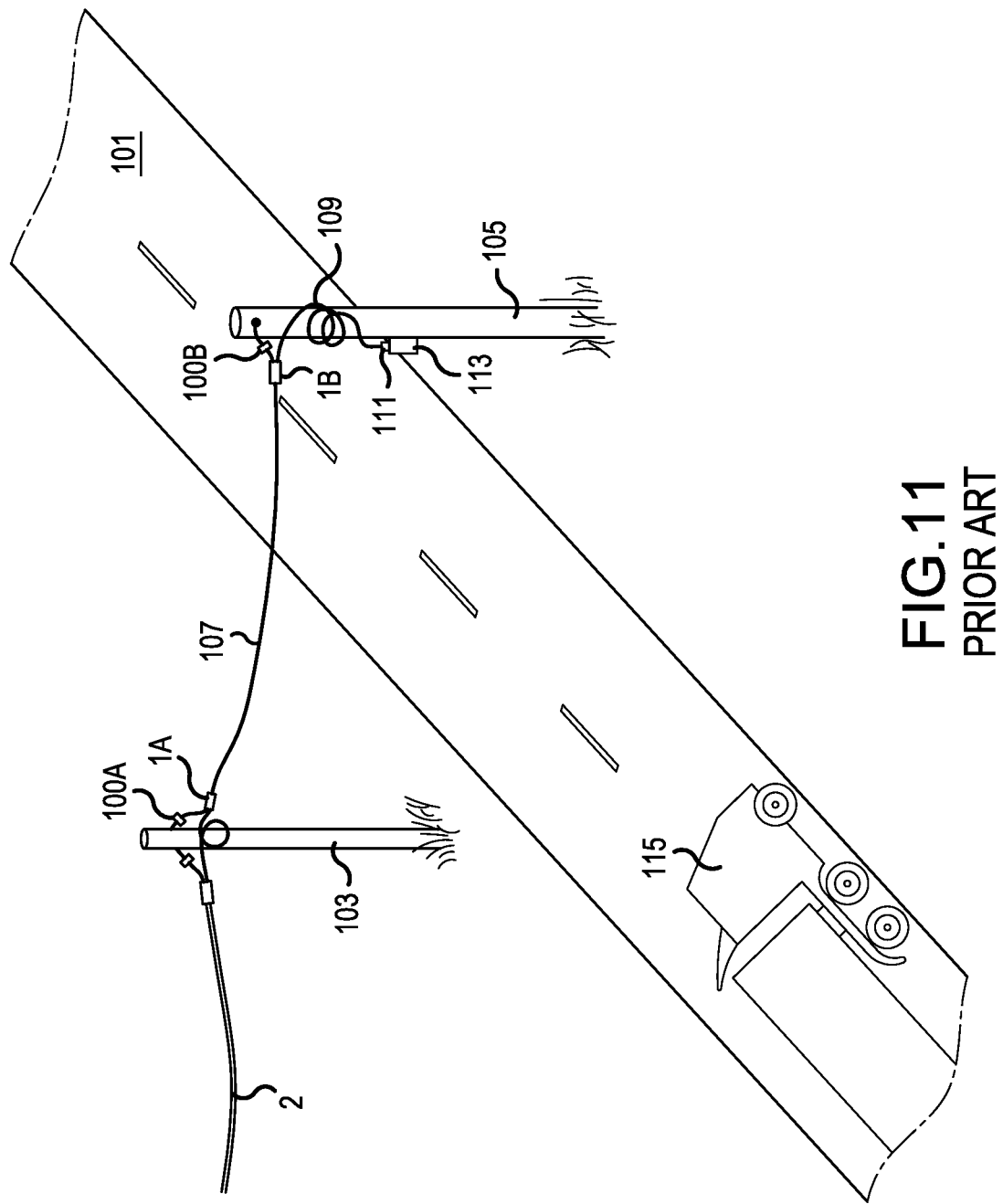
FIG. 11 shows a roadway with an aerial span of cable existing between first and second poles over the roadway.
Figure 12:
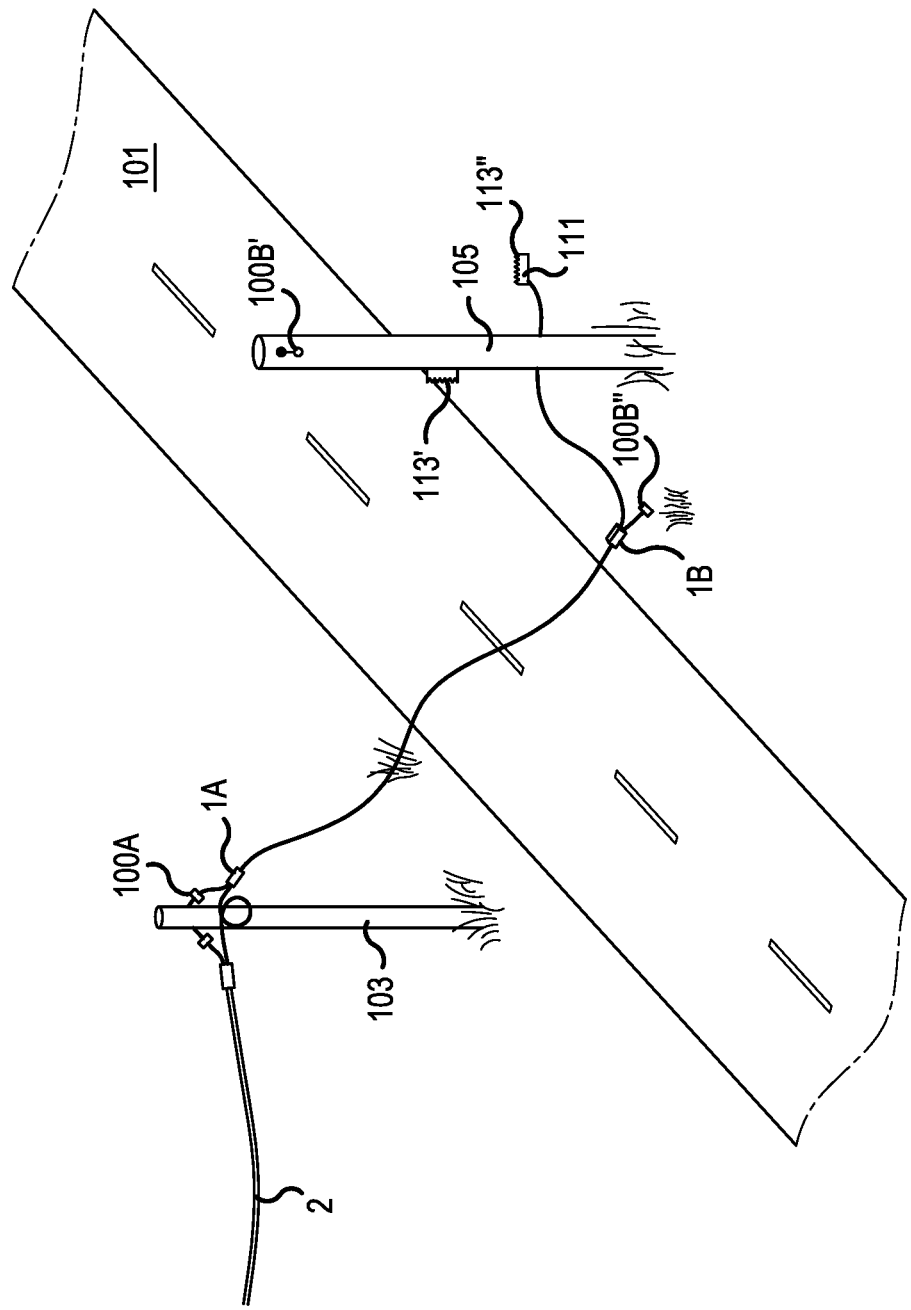
FIG. 12 shows the roadway of FIG. 11 after the aerial span has broken away from the second pole.
Figure 13:
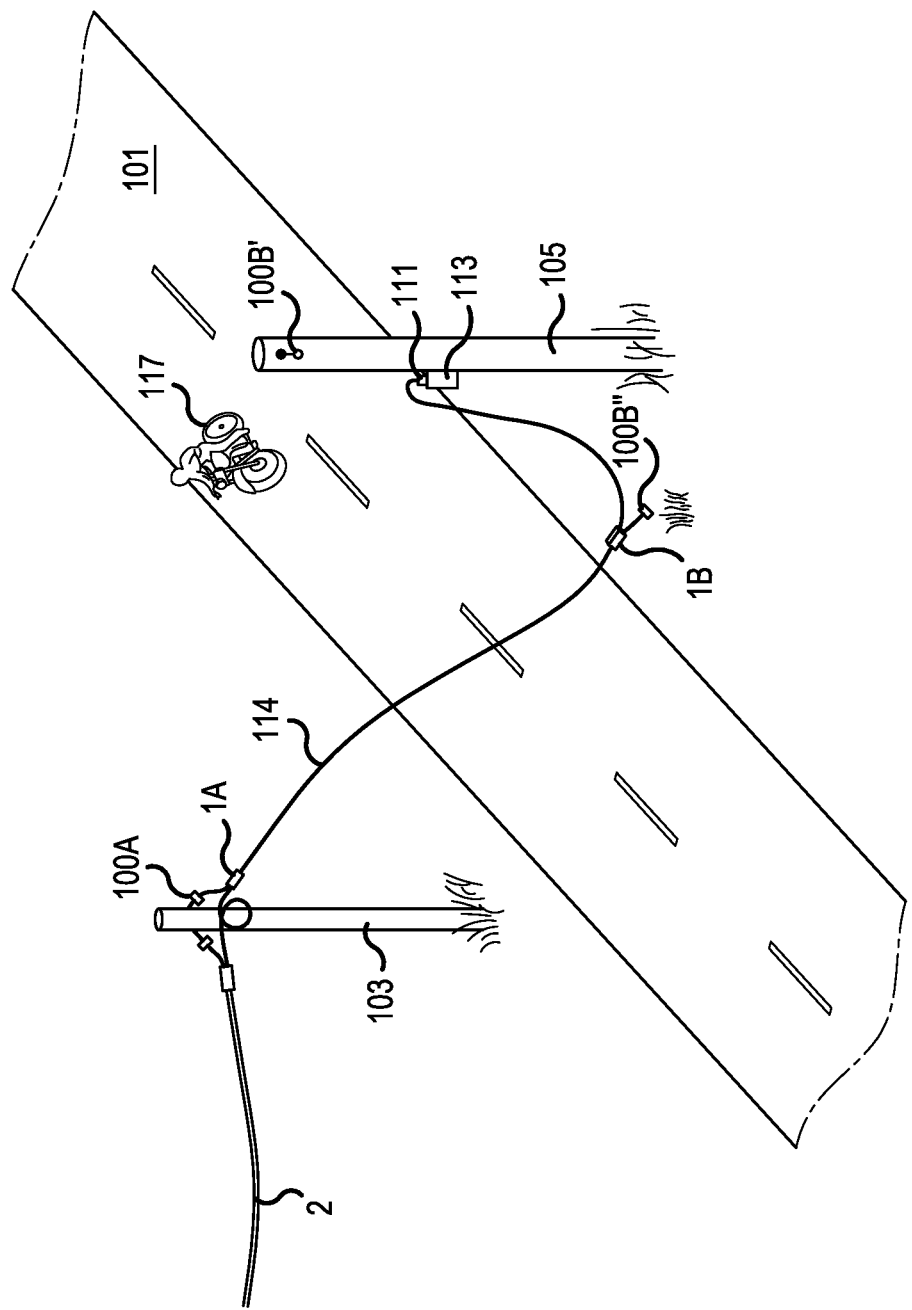
FIG. 13 shows the roadway of FIG. 11 when a dangerous lowered aerial span exists across the roadway.

The first and second wedge sidewalls 282 and 283 each include a top 286 insertable into a respective one of the guide channels 18 and 19 of each shell sidewall 11 and 12, respectively. The inner flanges of the guide channels 18 and 19 of the shell 10 keep the tops 286 of the first and second wedge sidewalls 282 and 283 secure within the guide channels 18 and 19, respectively. The wedge 280 also includes a tail wire 288 with a loop 289 (not illustrated in FIGS. 24-26) at the end of the tail wire 288. The loop 289 may be formed the same as the loop 89 of FIGS. 8-10. The tail wire 288 is strongly secured to the wedge base 281 by long crimps 279, or by multiple crimps 79 (as shown in FIG. 8), or by welds or the like.

A cutout portion 155 is formed within the wedge base 281 and opens to an area between the first and second wedge sidewalls 282 and 283. The cutout portion 155 is defined by first and second side edges 157 and 159 extending proximate the first and second wedge sidewalls 282 and 283, respectively, e.g., extending parallel to lower ends of the first and second wedge sidewalls 282 and 283. The cutout portion 155 is also defined by first and second end edges 161 and 163 formed in the wedge base 281. The first and second end edges 161 and 163 extend between the first and second side edges 157 and 159. The first end edge 161 is formed as an inclined edge portion, with the portion of the first end edge 161 coincident with the wedge base 281 being closer to the second end 285 of the wedge 280. For example, an angle 162 of the first end edge 161 relative to a plane of the wedge base 281 may be approximately forty five degrees. The first and second side edges 157 and 159 and the second end edge 163 may be formed perpendicular to the wedge base 281.

Figure 28:
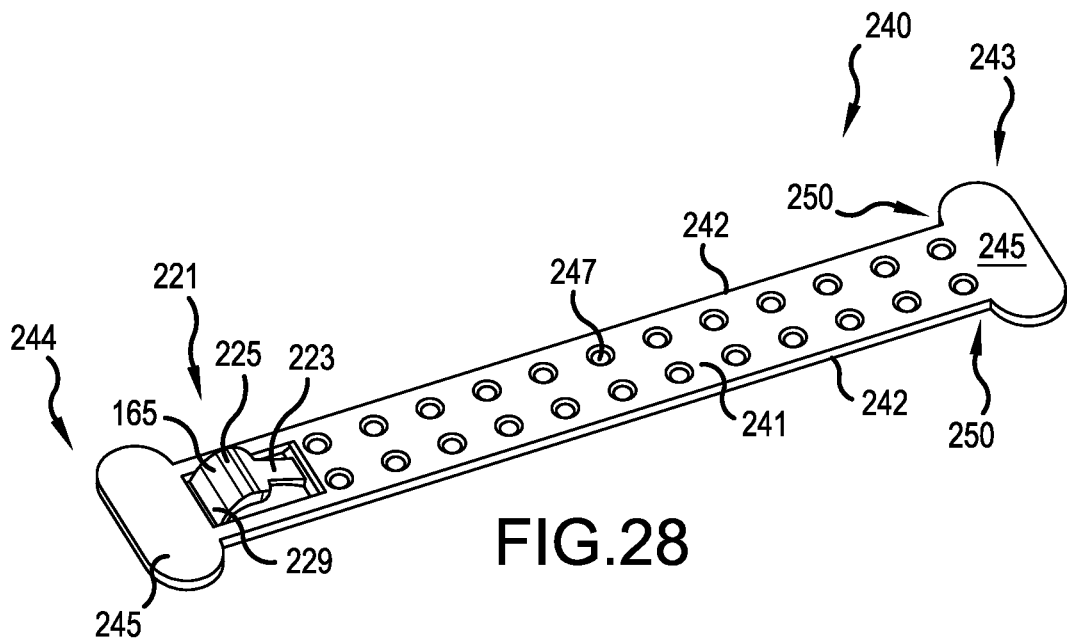
FIG. 28 is a top perspective view of a shim, in accordance with the present invention.
Figure 29:
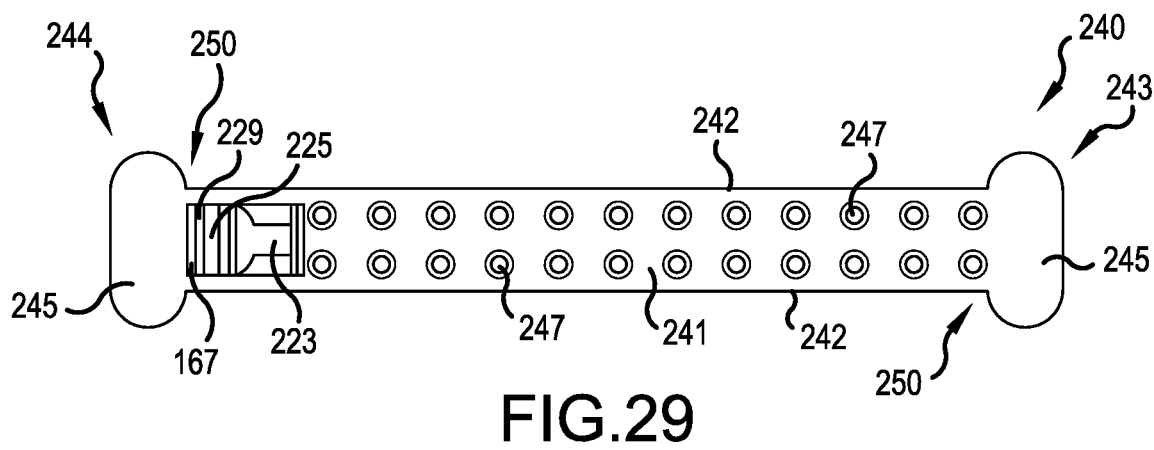
FIG. 29 is a top view of the shim of FIG. 28.
Figure 30:
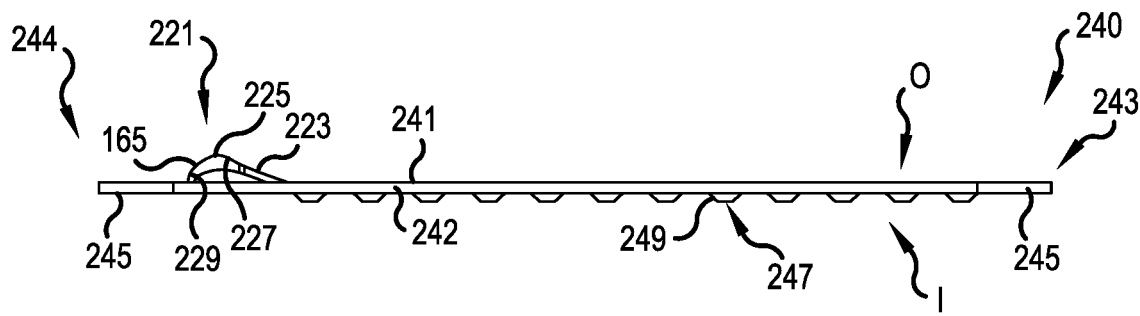
FIG. 30 is a side view of the shim of FIGS. 28 and 29.

FIGS. 28-30 show an inventive shim 240 in accordance with the present invention. The new shim 240 is similar to the prior art shim 40 of FIGS. 5 and 6, but includes a blade element 221. The shim 240 has an inside surface I that engages with the cable 2 and an outside surface O that engages with the wedge base 281. The shim 240 includes an elongate shim base 241 having a center longitudinal axis. The shim base 241 is substantially rectangular. In one embodiment, the width of the elongate shim base 241 is greater than the distance between the inner flanges of the guide channels 18 and 19 to prevent the shim 240 from easily dislodging from the shell 10 when only the shim 240 resides within the shell 10.

The shim 240 has longitudinal sides 242, a first end 243 and a second end 244. End sections 245 are coupled to the first end 243 and the second end 244 of the shim 240. The end sections 245 have substantially smooth inner surfaces to prevent damage to the cable 2.

The shim 240 makes substantially an "I" formation with the positioning of the shim base 241 between the end sections 245. With a slight tilt, the shim 240 passes between the inner flanges of the guide channels 18 and 19 and then lies flat on the shell base 15 between the first and second shell sidewalls 11 and 12. The end sections 245 in combination with the shim base 241 create inner corners 250 of the "I" formation. The end sections 245 fit outside the dimensions of the shell 10, so that the corners 250 create a stop abutment to capture the shim 240 within the shell 10, i.e., the corners 250 prevent the shim 240 from sliding out of the shell 10 longitudinally.

The shim base 241 can also include a friction engaging surface to increase a friction coefficient between the cable 2 and the shim base 241. The friction engaging surface is located on the inside surface I of the shim base 241, as seen in FIG. 30, and includes a plurality of holes 247 with raised edges 249 surrounding the holes 247 on the inside surface I of the shim 240. The raised edges 249 face and engage the cable 2, and also face, but do not engage, the inner friction engaging surface 16 of the shell 10.

The blade element 221 is attached, e.g., integrally formed with, the shim 240. The blade element 221 includes a blade base 223 with a top side 225 and a bottom side 227. A cutting portion 229 extends away from the blade base 223 at one end of the blade base 223 on the bottom side 227. The other end of the blade base 223 is attached to, or integrally formed with, the shim base 241, and a flexibility or resiliency of the blade base 223 allows the cutting portion 229 to deflect downwardly, so that the cutting portion 229 can extend below the inside surface I of the shim 240 in FIG. 30.

A gap 167 exists between the cutting portion 229 and the end section 245 closest to the cutting portion 229 to provide clearance for the blade element 221 to move, e.g., pivot, flex or bend, relative to a plane of the shim base 241. The top side 225 of the blade base 223 includes a guide surface 165 and the bottom end of the cutting portion 229 includes a cutting edge 231. The function of these elements will be addressed with reference to FIGS. 35-37.

Figure 2:
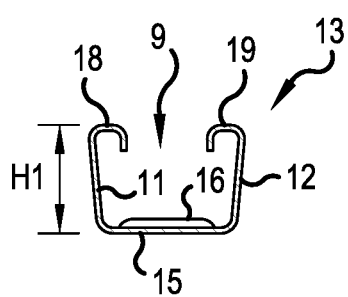
FIG. 2 is a cross sectional view of a first end of a shell of the cable clamp, taken along line II-II in FIG. 1 with all elements but the shell removed.
Figure 3:
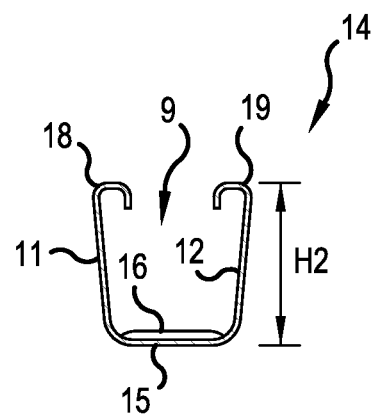
FIG. 3 is an end view of a second end of the shell of the cable clamp, from the perspective of line III-III of FIG. 1 with all elements but the shell removed.
Figure 4:
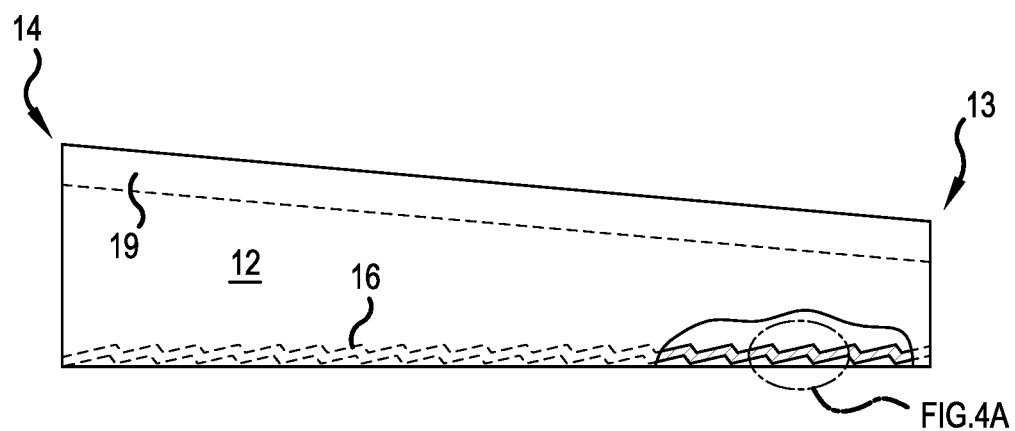
FIG. 4 is a side view with partial transparency of the shell of the cable clamp of FIG. 1.
Figure 4A:
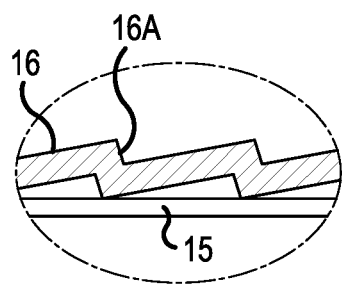
FIG. 4A is a close-up view of a portion within FIG. 4.
Figure 5:
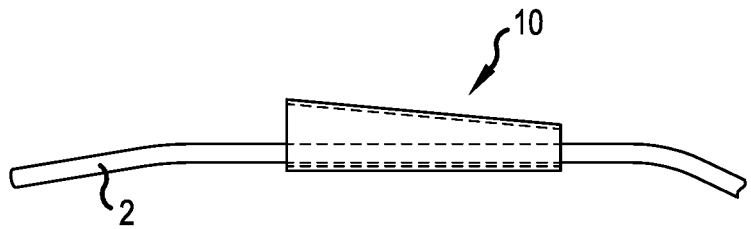
FIG. 5 is a side view of a cable within a cable channel of the shell of FIG. 1.
Figure 31:
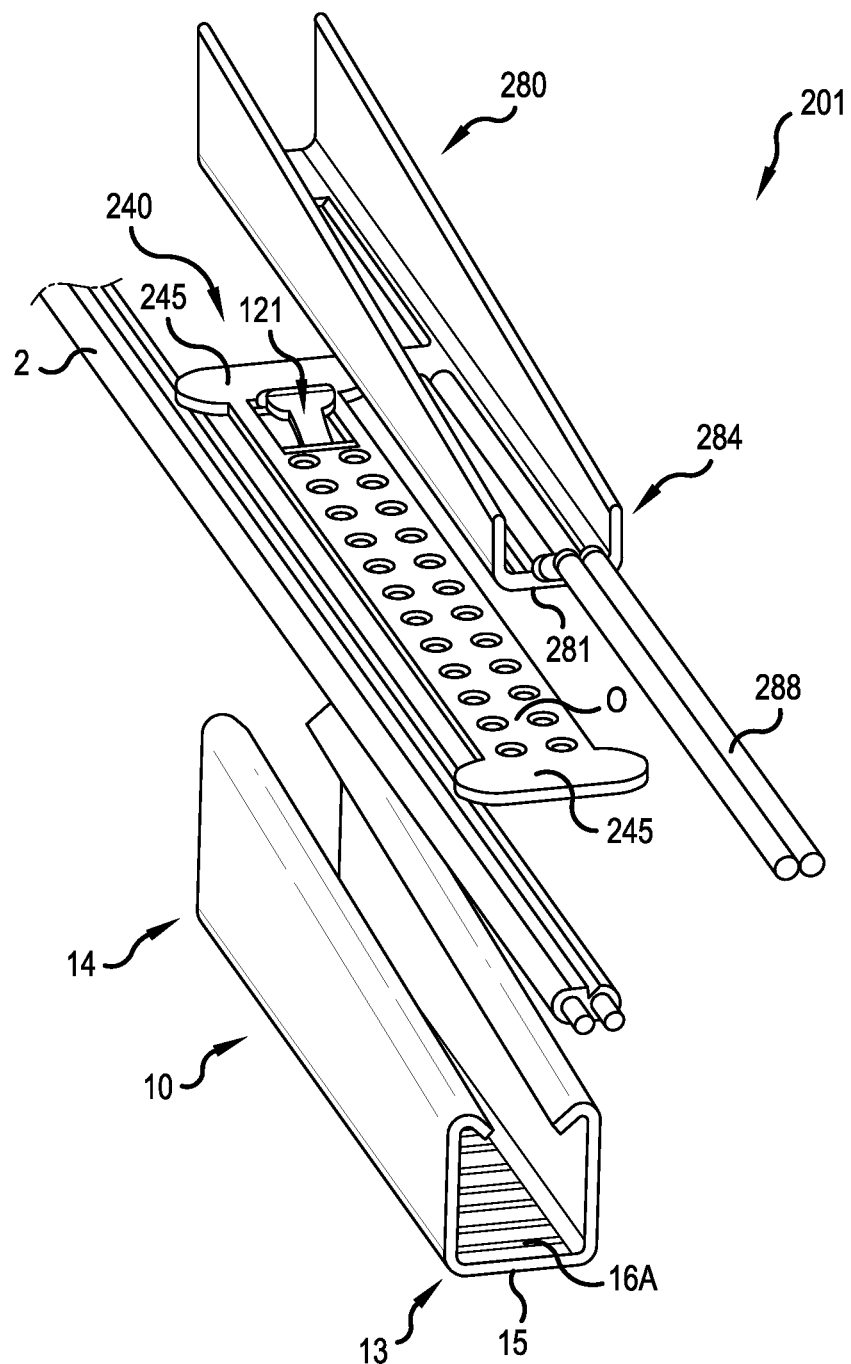
FIG. 31 is a rear exploded view of the wedge and shim of FIGS. 24-30 and the shell of FIGS. 2-4 aligned to form a cable clamp to capture a length of cable.
Figure 32:
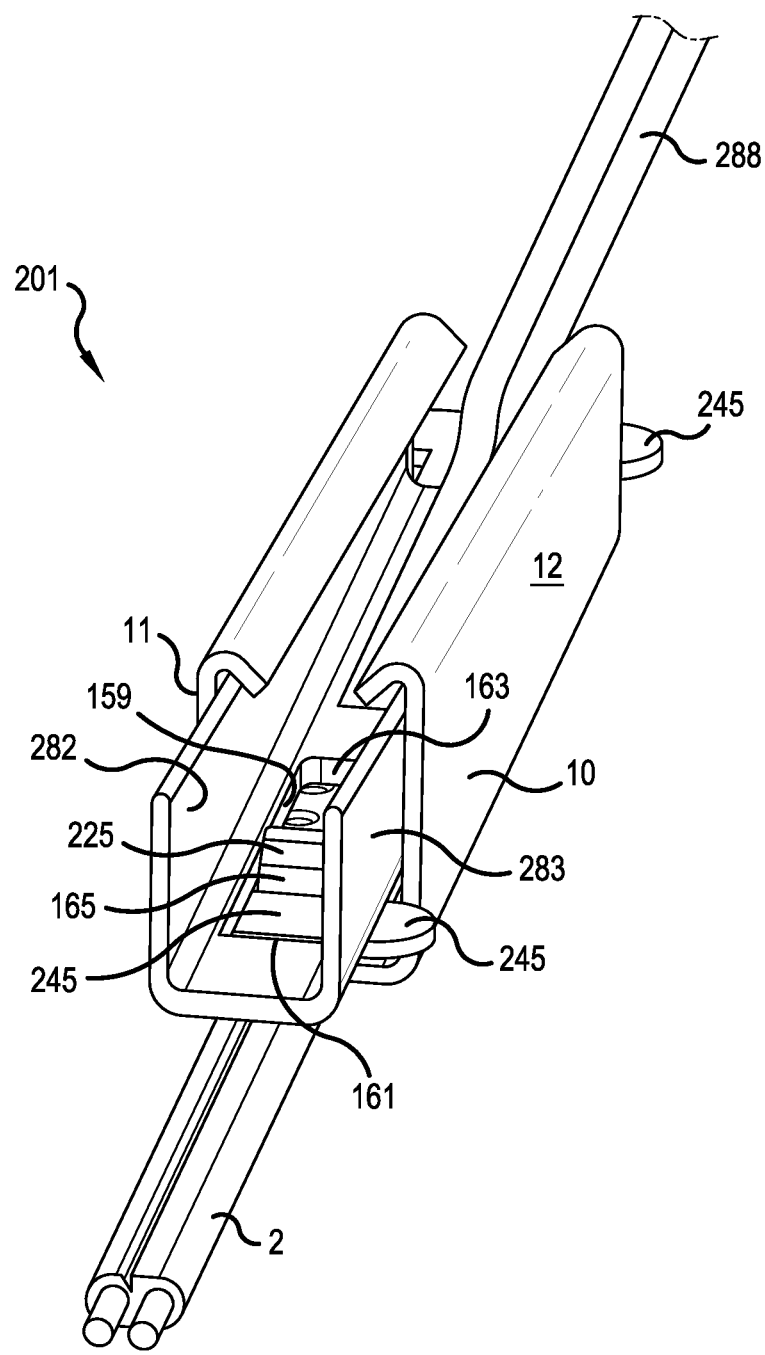
FIG. 32 is a front perspective view of the assembled cable clamp of FIG. 31.

FIG. 31 is a rear exploded view of the wedge 280 and the shim 240 of FIGS. 24-30 and the shell 10 of FIGS. 2-4 aligned to form a cable clamp 201 to capture a length of cable 2. FIG. 32 is a front perspective view of the assembled cable clamp 201 of FIG. 31. FIG. 33 is a top view of the cable clamp 201 of FIG. 32, and FIG. 34 is a cross sectional view taken along line XXXIV-XXXIV in FIG. 33.

The first end 284 of the wedge 280 is insertable into the second end 14 of the shell 10, so that the shorter height of the wedge 280 fits into the larger height H2 of the shell 10. The wedge base 281 slides along the outside surface O of the shim 240. As the wedge 280 is pulled further into the shell 10 in the direction of arrow A in FIGS. 1 and 10, the wedge base 281 increasingly biases the shim 240 toward the shell base 15 of the shell 10 to sandwich the cable 2 between the shim 240 and the shell base 15. A hammer can be used to tap the wedge 280 into the shell 10 above the shim 240 to fully secure the cable 2 in the clamp 201.

When the wedge 280 is slid in the direction of arrow A and pushed or pulled tightly, the cable 2 is sandwiched between the shim 240 and the shell base 15 of the shell 10. The raised edges 249 of the holes 247 of the shim 240 slightly grip into the outer upper surface of the jacket of the cable 2, and the teeth 16A of the shell base 15 slightly grip into the outer bottom surface of the jacket of the cable 2. The raised edges 49 and teeth 16a produce a very large coefficient of friction over an extended length of the cable 2 to cause the cable 2 to be essentially fixed to the clamp 1, as if adhered to the clamp 1. The cable 2 will not easily slip within the clamp 1. More precisely, the weight of an aerial span of the cable 2 will not cause the cable 2 to slip in the direction opposite to arrow A in FIGS. 1 and 10 relative to the clamp 201.

The cable clamp 201 of the present invention is assembled in the same manner as the prior art cable clamp 1 of FIGS. 1-10, except that the blade element 221 underlies the cutout portion 155 of the wedge base 281 and protrudes into the cutout portion 155 to reside within the area between the first and second wedge sidewalls 282 and 283. In other words, the top side 225 of the blade base 223 and its guide surface 165 protrude into the cutout portion 155.

The shim 240 is essentially fixed to the shell 10 in the longitudinal direction due to the abutments between its inner corners 250 of the end sections 245 and ends of the first and second shell sidewalls 11 and 12 at the first and second ends 13 and 14 of the shell 10. Hence, the shim 240 does not move laterally relative to the shell 10. As the shell 10 moves laterally relative to the wedge 280 to exert a greater frictional clamping force on the cable 2, the top side 225 and guide surface 165 of the blade base 223 slide within the cutout portion 155 toward the first end edge 161.

FIGS. 33 and 34 show the length 2Z between the first and second end edges 161 and 163. The top side 225 of the blade element 221 is located proximate the middle of the distance 2Z between the first and second end edges 161 and 163. This position may represent the typical placement of the wedge 280 relative to the shell 10 when the cable 2 is secured to the clamp 201 by a frictional force sufficient to support an aerial span of the cable 2. As also illustrated in FIG. 34, the second end 285 of the wedge 280 extends away from the second end 14 of the shell 10 by a distance Y when the cable 2 is adequately supported by the clamp 201.

Figure 35:
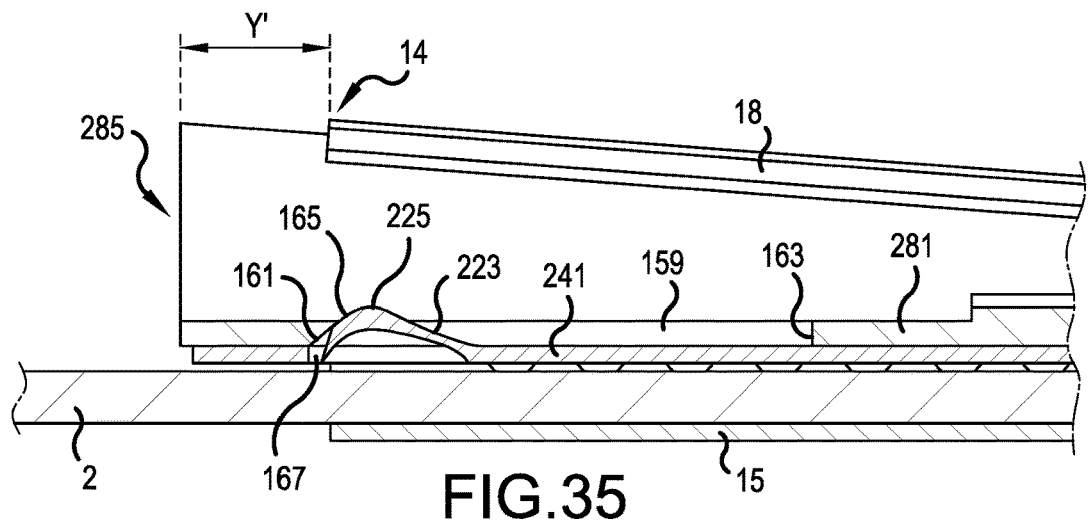
FIG. 35 is a close-up cross sectional view of a blade element of the shim making initial contact with an inclined edge portion of the wedge as force is exerted on the cable.

FIG. 35 is a close-up cross sectional view of the blade element 221 of the shim 240 making initial contact with the inclined edge portion 161 of the wedge 280, i.e., the first end edge 161, as an excessive force is exerted on the cable 2. At the point of initial contact, a distance Y' exists between the second end 285 of the wedge 280 and the second end 14 of the shell 10. The distance Y' is less than the distance Y, and is a result of the shell 10 and shim 240 moving toward the second end 285 of the wedge 280 as the force on the cable 2 increases.

Figure 36:
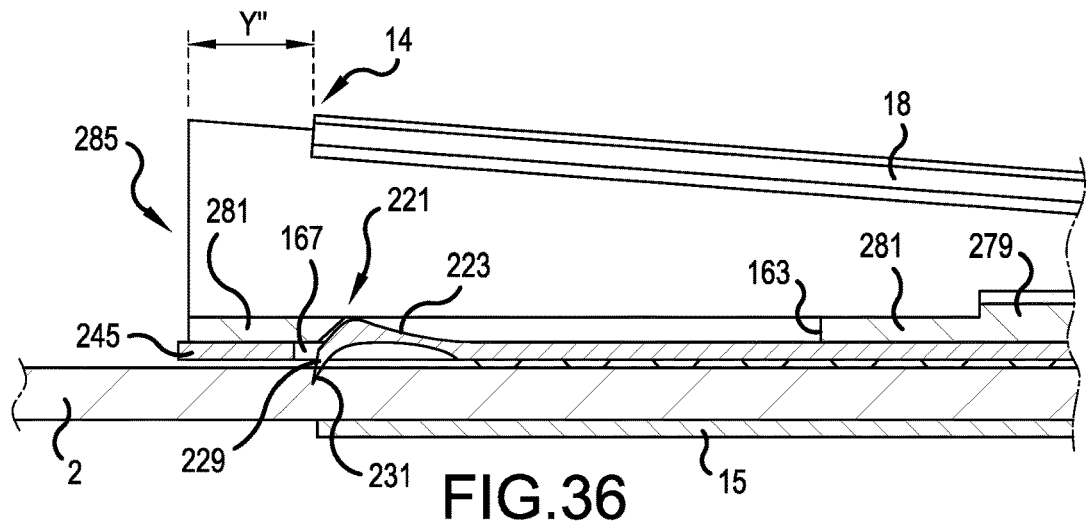
FIG. 36 is a close-up cross sectional view of the blade element riding the inclined edge portion to partially cut the cable.

As the force on the cable 2 further increases, the guide surface 165 engages the inclined edge portion 161, as illustrated in FIG. 36. The complimentary angles smoothly press the cutting edge 231 of the cutting portion 229 downward in FIG. 36 and partially into the cable 2. As the guide surface 165 slides on the inclined edge portion 161, a distance Y" exists between the second end 285 of the wedge 280 and the second end 14 of the shell 10. The distance Y" is less than the distance Y'.

Figure 37:
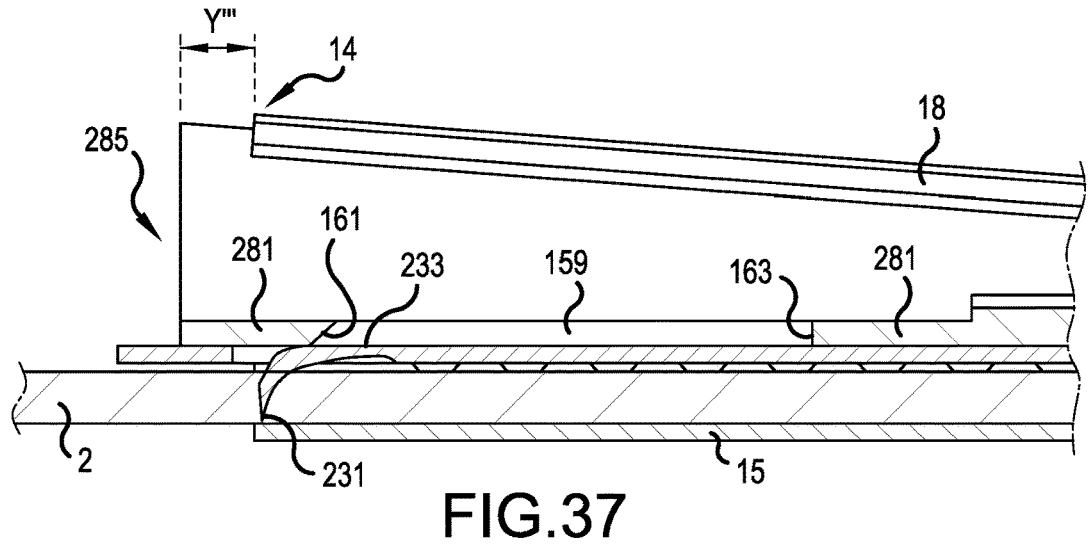
FIG. 37 is a close-up cross sectional view of the blade element passing by the inclined edge portion to fully cut the cable.

As the force on the cable 2 increases to a preset value, like 1,800 Newtons (about 400 pounds), the guide surface 165 pass by the inclined edge portion 161 and rides along the wedge base 281, as illustrated in FIG. 37. As the guide surface 165 slides on the wedge base 281, a distance Y''' exists between the second end 285 of the wedge 280 and the second end 14 of the shell 10. The distance Y''' is less than the distance Y". The cutting edge 231 fully cuts the cable 2 proximate the second end 14 of the shell 10. The weight of the aerial span of the cable 2 will remove the cut end of the cable 2 from the clamp 201, such that the cable 2 is freed from the clamp 1 when the preset tension on the cable 2 is exceeded.

Figure 38:
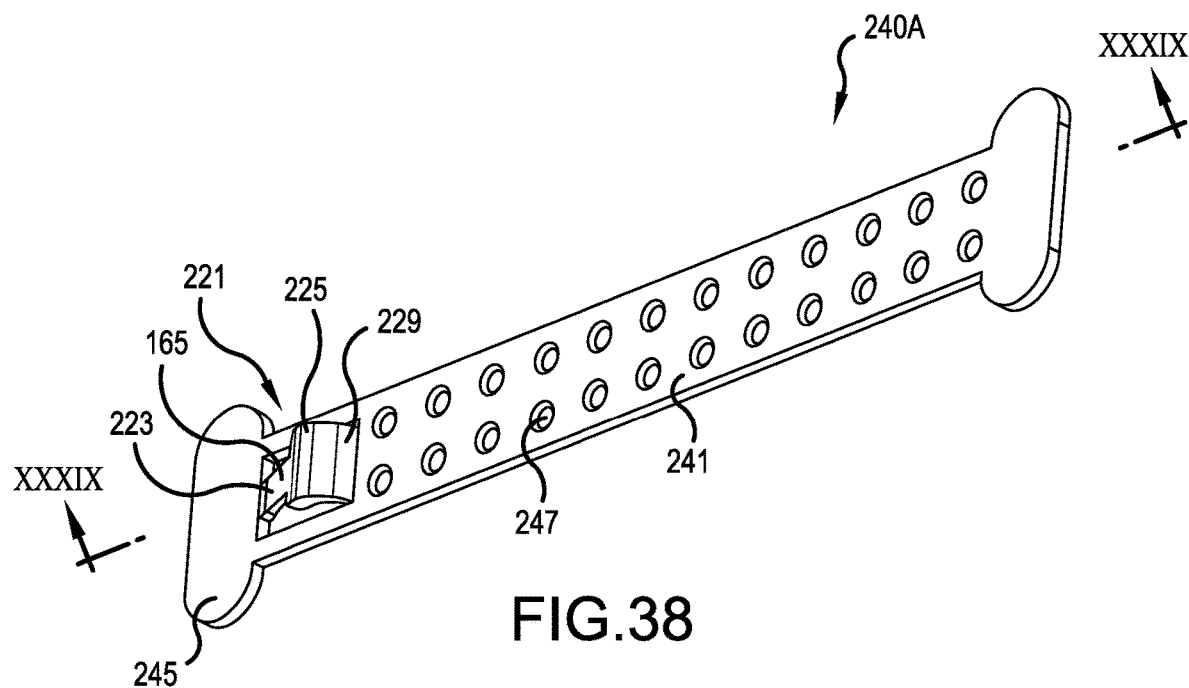
FIG. 38 is a top perspective view of a shim, in accordance with a second embodiment of the present invention.
Figure 39:
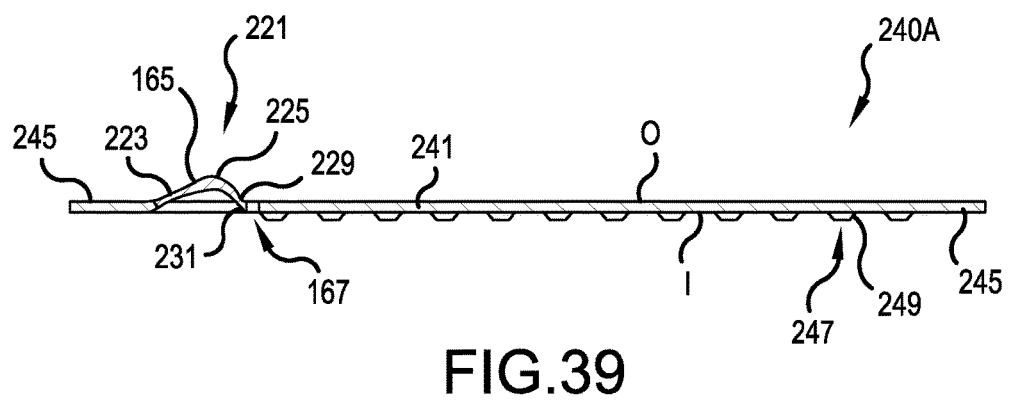
FIG. 39 is a side view of the shim of FIG. 38.

FIG. 38 is a top perspective view of a shim 240A, in accordance with a second embodiment of the present invention, and FIG. 39 is a side view of the shim 240A of FIG. 38. FIGS. 38 and 39 illustrate that the connection of the blade element 221 to the shim 240A may be varied. In FIGS. 38 and 39, the blade base 223 is integrally formed with the end section 245. The cutting portion 229 and its cutting edge 231 extend away from the blade base 223 and are positioned closer to the shim base 241. The flexibility or resiliency of the blade base 223 allows the cutting portion 229 to deflect downwardly, so that the cutting portion 229 can extend below the inside surface I of the shim 240A in FIG. 39.

There are two other differences between the second embodiment of the shim 240A (FIGS. 38 and 39) and the first embodiment of the shim 240 (FIGS. 28-30). First, the gap 167 exists between the cutting portion 229 and the shim base 241 to provide clearance for the blade element 221 to move, e.g., pivot, flex or bend, relative to a plane of the shim base 241. Second, the top side 225 of the blade base 223 includes the guide surface 165, positioned closer to the end section 245 than the shim base 241.

Figure 40:
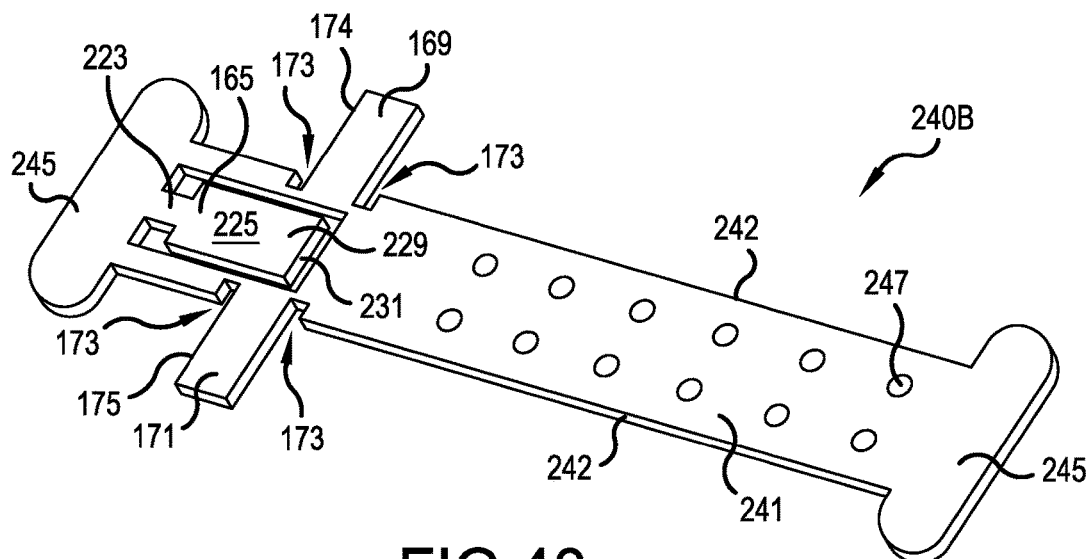
FIG. 40 is a top perspective view of a shim blank, in accordance with a third embodiment of the present invention.
Figure 41:
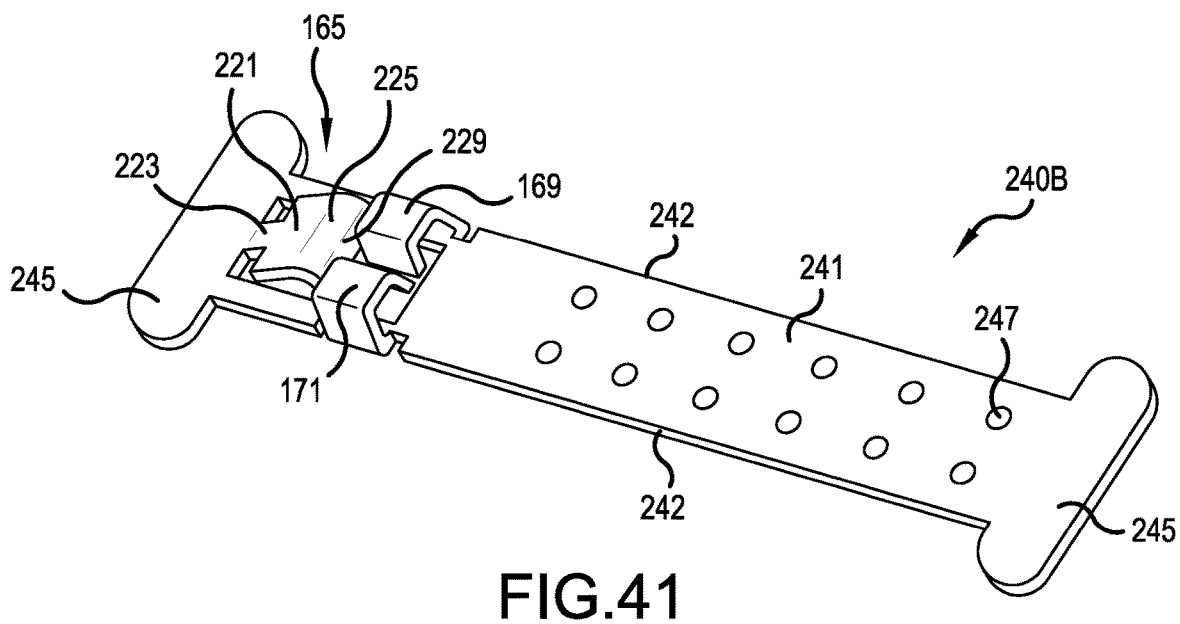
FIG. 41 is a top perspective view of the third embodiment of the shim after bending parts of the shim blank of FIG. 40.

FIG. 40 is a top perspective view of a shim blank, in accordance with a third embodiment of the present invention, and FIG. 41 is a top perspective view of the third embodiment of a shim 240B after bending parts of the shim blank of FIG. 40.

The shims 240 and 240A of FIGS. 28-30 and 38-39 may be formed by stamping a piece of metal, e.g., galvanized steel, to form a shim blank. The thickness and/or strength of the metal used to form the shim 240 or 240A is relatively unimportant for the purpose of enhancing the friction between the wedge base 281 and the cable 2. However, when the metal is used to form the blade element 221, the thickness and/or strength of the metal is much more important. If the metal is too thin and/or weak, the cutting portion 229 and cutting edge 231 may deform and bend rather than slice through the cable 2.

FIG. 40 shows a shim 240B in its "blank" form, after being stamped from a piece of metal. First and second wings 169 and 171 extend away from the shim base 241. The wings 169 and 171 extend away from the longitudinal sides 242 of the shim base 241, and are separated from the longitudinal sides 242 by notches 173.

The blank form of the shim 240B is then subjected to a machine bending operation. The top side 225 of the blade element 221 is curved upwardly into an arc shape, which causes the cutting portion 229 and cutting edge 231 to face downwardly in FIG. 41. The wings 169 and 171 are folded inwardly so that sidewalls 174 and 175 of the wings 169 and 171 form a reinforcement fence, against which the cutting portion 229 of the blade element 221 can slide against.

The notches 173 allow the wings 169 and 171 to be folded inwardly of the longitudinal sides 242. The folded wings 169 and 171 can fit into, and slide within, the cutout portion 155 of the wedge base 281 along with the blade element 221, as the shell 10 moves relative to the wedge 280. The reinforcement fence provided by the sidewalls 174 and 175 of the folded wings 169 and 171 will prevent the cutting portion 229 from bending in the direction of the shim base 241, as the blade element 221 is pressed downwardly by the engagement between the inclined edge portion 161 and the guide surface 165.

Figure 44:
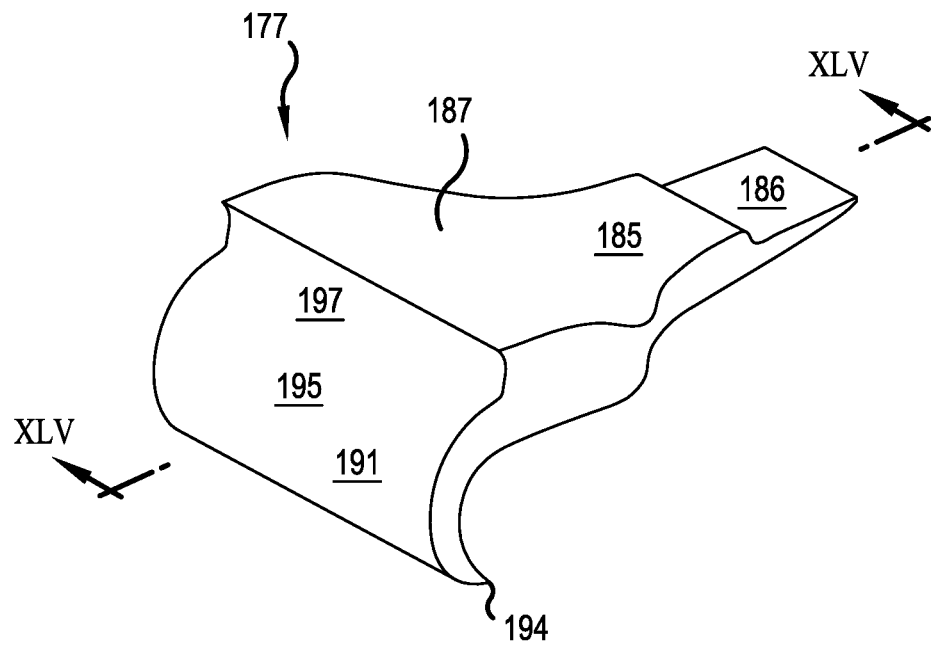
FIG. 44 is a top perspective view of a blade element, in accordance with a second embodiment.
Figure 45:
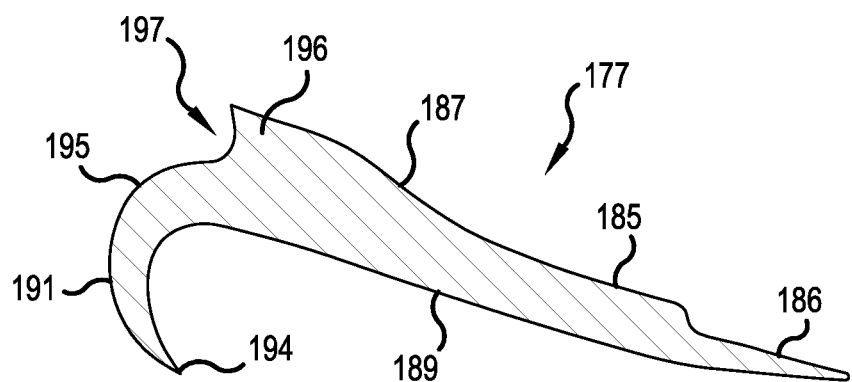
FIG. 45 is a cross sectional view taken along line XLV-XLV in FIG. 44.

FIG. 42 is a top perspective view of a shim 240C, in accordance with a third embodiment of the present invention, and FIG. 43 is a cross sectional view taken along line XLIII-XLIII in FIG. 42. FIGS. 44 and 45 shows details of a new blade element 177 of the shim 240C. The shim 240C includes many of the same features as the shims 240, 240A and 240B, and such features are labeled by the same reference numerals.

The blade element 177 is attached, e.g., integrally formed with, the shim 240C, or alternatively is formed of a different material than the shim 240C and is attached to the shim 240C. For example, the blade element 177 may be formed of a thicker or stronger metal, like stainless steel, and may be attached to the shim 240C by a welding or adhesive process at a joint region 179. The joining area 181 of the shim base 241 may be rectangular in shape and separated from the remaining shim base 241 by slits 183. The slits 183 allow the joining area 181 to flex downwardly so that the blade element 177 can cut into the cable 2 beneath the blade element 177. The flexing of the shim base 241 may be needed, as the stronger material used to form the blade element 177 may not have enough flexibility.

The blade element 177 includes a blade base 185 with a top side 187 and a bottom side 189. A cutting portion 191 extends away from the blade base 185 at one end of the blade base 185 on the bottom side 189. The other end 186 of the blade base 185 is attached to the joining area 181 of the shim base 241, and a flexibility or resiliency of the joining area 181 allows the cutting portion 191 to deflect downwardly, so that the cutting portion 191 can extend below the inside surface I of the shim 240C in FIGS. 46 and 47.

A gap 193 exists between the cutting portion 191 and the end section 245 closest to the cutting portion 191 to provide clearance for the blade element 177 to move, e.g., pivot, flex or bend, relative to a plane of the shim base 241. The top side 187 of the blade base 185 includes a guide surface 195 and the bottom end of the cutting portion 191 includes a cutting edge 194. The top side 187 includes a hump 196. The hump 196 had a notch 197. The notch 197 will interact with a modified first end edge 161A of the cutout portion 155.

Figure 46:
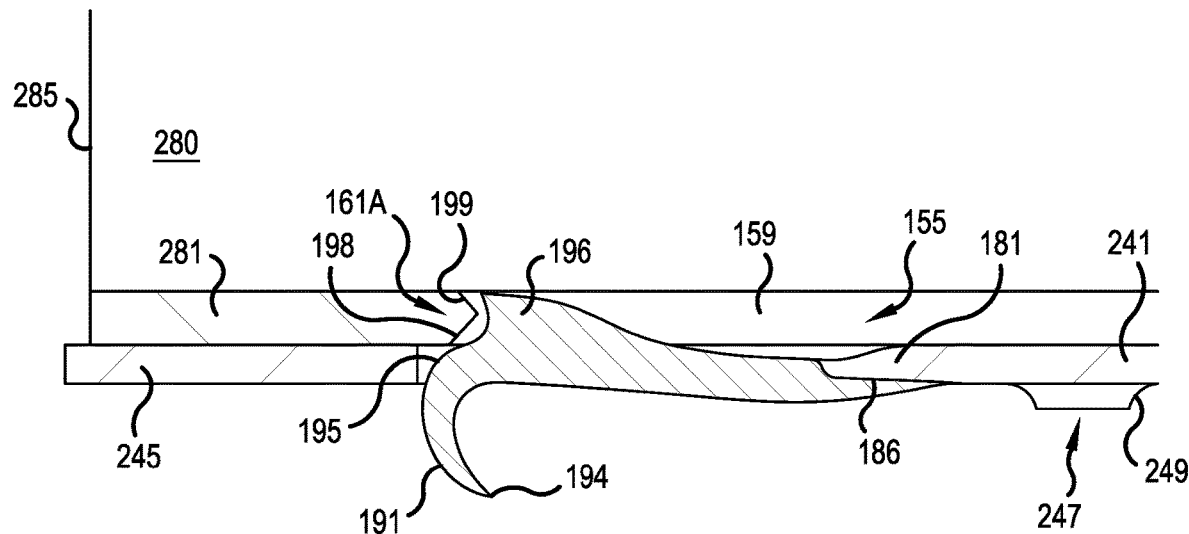
FIG. 46 is a close-up cross sectional view of the blade element of FIG. 45 contacting a modified first end edge of a cutout portion in the wedge of FIGS. 24-27.
Figure 47:
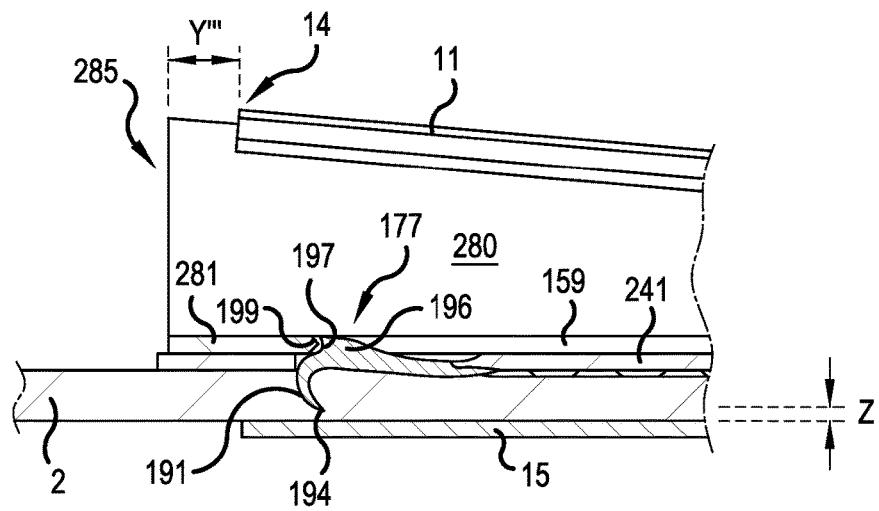
FIG. 47 is a close-up cross sectional view of the blade element of FIGS. 42-46 in the same context illustrated in FIG. 37.

As best seen in FIGS. 46 and 47, the first end edge 161A of the cutout portion 155 has a shortened, inclined edge portion 198 and an opposite, inclined edge portion 199. The guide surface 195 engages the shortened, inclined edge portion 198. The complimentary angles smoothly press the cutting edge 194 of the cutting portion 191 downward to fully cut the cable 2 proximate the second end 14 of the shell 10, e.g., when the second end 14 of the shell 10 has slid forward to be distanced about y''' from the second end 285 of the wedge 280. The dimensions may be arranged so that the cable 2 is severed at a preset value, like 1,800 Newtons (about 400 pounds).

The distance y''' is about the same as the distance depicted in the embodiment of FIG. 37. However, in the embodiment of FIG. 37, once the top side 225 of the blade element 121 clears the inclined edge portion 161, the top side 225 of the blade element 121 slides along the wedge base 281. In the embodiment of FIGS. 46 and 47, the blade element 177 cannot clear the shortened, inclined edge portion 198. Rather, the notch 197 of the hump 196 will engage to the opposite, inclined edge portion 199 and lock the blade element 177 to the first end edge 161A. Since the blade element 177 is attached to the shim 240C and the shim 240C is locked (in the longitudinal directions) to the shell 10 by the end sections 245, any further excessive axial force that is applied to the cable 2 will cause the cutting edge 194 and the cutting portion 191 to bend. The fish-hook shape of the cutting portion 191 will open, causing the cutting edge 194 to penetrate deeper into the cable 2. This is particularly useful where the cutting edge 194 did not fully cut through the cable 2 by a small distance Z, e.g., because the cable 2 had a large thickness, or because the cutting portion 191 deformed in the rearward direction (toward the first end 13 of the shell 10) as it penetrated the cable 2. Further sliding of the shell 10 forward will cause the cutting portion 191 to deform forwardly (toward the second end 14 of the shell 10) as the cable is pull horizontally against the cutting portion 191, which will pull the cutting edge 194 deeper into the cable 2 toward the shell base 15 to sever the remaining distance Z of the cable 2.

A method of installing the cable 2 within the cable clamp 120, 120A, 201 includes: Inserting a length of the cable 2 into the channel 9 of the shell 10 adjacent to the shell base 15; Installing a blade element 121, 121A, 121B, 177, 221 into the channel 9; Positioning a cutting edge 131, 194, 231 of the blade element 121, 121A, 121B, 177, 221 to face the cable 2; Inserting a wedge 80, 80A, 280 into the shell 10 with a wedge base 81, 281 facing the cable 2; and Sliding the shell 10 and the wedge 80, 280 relative to each other to cause the cable 2 to engage more tightly between the wedge base 81, 281 and said shell base 15 and create a frictional engagement along a length of the cable 2 in the channel 9. More preferably, the method includes inserting a shim 40,

240, 240A, 240B, 240C onto the length of cable 2 in the channel 9 prior to inserting the wedge 80, 80A, 280 into the shell 10.

If an axial load is applied to the cable 2, in a direction opposite to direction A in FIG. 18, in excess of a preset value, the blade element 121, 121A, 121B, 177, 221 will cut the cable 2 with the cutting edge 131, 194, 231 of the blade element 121, 121A, 121B, 177, 221. The preset value is 700 Newtons, 800 Newtons, 1,000 Newtons, or any desired preset value, such as 1,700 Newtons.

The dimensions of the elements may be scaled, and/or the proportional dimensions between different elements may be varied, to accommodate differently sized cable clamps and differently sized cables, as well as to cause the blade element to sever a cable upon the application of different axial forces.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A cable clamp comprising:
   a shell having a shell base and first and second sidewalls connected to said shell base, said shell base, first sidewall and second sidewall forming a cable channel therebetween extending in a first direction to receive a length of cable therein;
   a wedge residing between said first and second sidewalls with a wedge base facing to said shell base, wherein movement of said shell relative to said wedge causes the cable to engage more tightly between said wedge base and said shell base;
   a blade element residing between said wedge base and said shell base, wherein said blade element includes a blade base and a cutting portion with a cutting edge, and wherein said cutting edge faces toward the cable; and
   a shim, residing between said wedge base and said shell base, and wherein the cable fits between said shim and said shell base, wherein said blade element is integrally formed with said shim and said wedge includes a cutout portion, said cutting edge being located within said cutout portion of said wedge and biased to move outside of said cutout portion toward said shell base if excessive force is applied to move said shell relative to said wedge.

2. The cable clamp according to claim 1, wherein a side of said shim facing said shell base includes first friction enhancing elements to engage a jacket of the cable in contact with said shim, wherein said first friction enhancing elements are holes punched through said shim so as to form raised edges around said holes on said side of said shim facing said shell base.

3. The cable clamp according to claim 2, wherein said shell base includes second friction enhancing elements to engage the jacket of the cable in contact with said shell base.

4. The cable clamp according to claim 1, wherein said blade element is biased by an inclined edge portion of said wedge to move toward the shell base, as said wedge and shell move relative to each other.

5. The cable clamp according to claim 1, further comprising:
   a cable with a length of said cable, extending along the first direction and residing against said shell base within said channel.

6. A cable clamp comprising:
   a shell having a shell base and first and second sidewalls connected to said shell base, said shell base, first sidewall and second sidewall forming a cable channel therebetween extending in a first direction to receive a length of cable therein;
   a wedge residing between said first and second sidewalls with a wedge base facing to said shell base, wherein movement of said shell relative to said wedge causes the cable to engage more tightly between said wedge base and said shell base;
   a blade element residing between said wedge base and said shell base, wherein said blade element includes a blade base and a cutting portion with a cutting edge, and wherein said cutting edge faces toward the cable; and
   a shim, residing between said wedge base and said shell base, wherein the cable fits between said shim and said shell base, wherein said blade element is attached to said shim and said wedge includes a cutout portion, said cutting edge being located within said cutout portion of said wedge and biased to move outside of said cutout portion toward said shell base if excessive force is applied to move said shell relative to said wedge, wherein said blade element includes a guide surface and wherein said guide surface can slide within said cutout portion of said wedge base as said shell moves relative to said wedge, wherein movement of said shell relative to said wedge can cause said guide surface to abut a first end edge of said cutout portion and the abutment causes said blade element to extend out of said cutout portion toward said shell base.

7. The cable clamp according to claim 6, wherein said blade element is integrally formed with said shim.

8. The cable clamp according to claim 6, wherein a side of said shim facing said shell base includes first friction enhancing elements to engage a jacket of the cable in contact with said shim, wherein said first friction enhancing elements are holes punched through said shim so as to form raised edges around said holes on said side of said shim facing said shell base.

9. The cable clamp according to claim 8, wherein said shell base includes second friction enhancing elements to engage the jacket of the cable in contact with said shell base.

10. The cable clamp according to claim 6, wherein first end edge of said cut out portion is an inclined edge portion.

11. The cable clamp according to claim 6, further comprising:
    a cable with a length of said cable, extending along the first direction and residing against said shell base within said channel.

12. A cable clamp comprising:
    a shell having a shell base and first and second sidewalls connected to said shell base, said shell base, first sidewall and second sidewall forming a cable channel therebetween extending in a first direction to receive a length of cable therein;
    a wedge residing between said first and second sidewalls with a wedge base facing to said shell base;
    a shim residing between said wedge base and said shell base, wherein a cable can fit between said shim and said shell base, and wherein movement of said shell relative to said wedge causes an inserted cable to engage more tightly between said shim and said shell base;
    a blade element attached to said shim, wherein said blade element includes a cutting portion with a cutting edge, and wherein said cutting edge faces toward said shell base, wherein said wedge includes first and second wedge sidewalls and said wedge base positioned between said first and second wedge sidewalls, wherein said wedge base and said first and second wedge sidewalls make an approximately U-shaped configuration; and a cutout portion formed within said wedge base and opening to an area between said first and second wedge sidewalls, said cutout portion being defined by first and second side edges extending proximate said first and second wedge sidewalls, respectively, and first and second end edges formed by said wedge base and extend between said first and second side edges, wherein said blade element underlies said cutout portion of said wedge base and protrudes into said cutout portion to reside within said area between said first and second wedge sidewalls, wherein said blade element includes a guide surface and wherein said guide surface can slide within said cutout portion of said wedge base as said shell moves relative to said wedge, and wherein movement of said shell relative to said wedge can cause said guide surface to abut said first end edge of said cutout portion and the abutment causes said blade element to extend out of said cutout portion toward said shell base.

13. The cable clamp according to claim 12, wherein said shim is fixed into position relative to said shell base by an abutments between end sections of said shim and ends of said first and second sidewalls of said shell.

14. The cable clamp according to claim 12, wherein said first end edge is formed as an inclined edge portion.

15. The cable clamp according to claim 12, wherein said blade element is integrally formed with said shim.

* * * * *